US011127052B2

(12) United States Patent
Teller

(10) Patent No.: US 11,127,052 B2
(45) Date of Patent: *Sep. 21, 2021

(54) MARKETPLACE FOR ADVERTISEMENT SPACE USING GAZE-DATA VALUATION

(71) Applicant: Google LLC, Mountain View, CA (US)

(72) Inventor: Eric Teller, San Francisco, CA (US)

(73) Assignee: Google LLC, Mountain View, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/446,357

(22) Filed: Jun. 19, 2019

(65) Prior Publication Data

US 2019/0303981 A1 Oct. 3, 2019

Related U.S. Application Data

(63) Continuation of application No. 15/145,125, filed on May 3, 2016, now Pat. No. 10,354,291, which is a (Continued)

(51) Int. Cl.
G06Q 30/02 (2012.01)
G06T 19/00 (2011.01)

(52) U.S. Cl.
CPC ....... G06Q 30/0276 (2013.01); G06T 19/006 (2013.01)

(58) Field of Classification Search
CPC .............. G06Q 30/0276; G06T 19/006; H04N 21/812; H04N 21/25883; H04N 21/25891;
(Continued)

(56) References Cited

U.S. PATENT DOCUMENTS 5,583,795 A 12/1996 Smyth
7,038,699 B2 5/2006 Sato et al.
(Continued)

FOREIGN PATENT DOCUMENTS

WO 2007027456 A1 3/2007
WO 2009143564 A1 12/2009
WO 2010060146 A1 6/2010

OTHER PUBLICATIONS

Calhoun et al., Synthetic Vision System for Improving Unmanned Aerial Vehicle Operator Situation Awareness, Enhanced and Synthetic Vision 2005, May 2005, vol. 5802, p. 219-230.
(Continued)

Primary Examiner — David J Stoltenberg
Assistant Examiner — Michael J Cross
(74) Attorney, Agent, or Firm — Lerner, David, Littenberg, Krumholz & Mentlik, LLP

(57) ABSTRACT

Methods and systems herein may help to provide an advertisement marketplace for advertisements that are valued according to gaze data from wearable computing devices. An exemplary method involves: receiving a listing request to sell advertisement rights to an advertisement space, wherein the listing request corresponds to a user-account; determining an advertisement value for the advertisement space, wherein the advertisement value is based on occurrences of the advertisement space in gaze data, wherein the gaze data is received from a plurality of wearable computing devices and is indicative of a respective wearer-view associated with each of the devices; in response to the listing request, updating an advertising-space database with a listing for the advertisement space, wherein the listing indicates the advertisement rights are available for purchase at a listing price that is based on the advertisement value; and
(Continued)

making the listing for the advertisement space available via a network-based advertisement marketplace.

15 Claims, 15 Drawing Sheets

Related U.S. Application Data continuation of application No. 13/292,898, filed on Nov. 9, 2011, now abandoned.

(58) Field of Classification Search
CPC .......... H04N 21/4223; H04N 21/4532; G02B 27/0172; G02B 2027/0138; G02B 2027/0141
See application file for complete search history.

(56) References Cited

U.S. PATENT DOCUMENTS

| | | |
|---|---|---|
| 7,073,129 B1 | 7/2006 | Robarts et al. |
| 7,391,887 B2 | 6/2008 | Durnell |
| 8,510,166 B2 | 8/2013 | Neven |
| 8,879,155 B1 | 11/2014 | Teller |
| 8,893,164 B1 | 11/2014 | Teller |
| 2002/0085843 A1 | 7/2002 | Mann |
| 2006/0028400 A1 | 2/2006 | Lapstun et al. |
| 2006/0036490 A1 | 2/2006 | Sagalyn |
| 2006/0105838 A1 | 5/2006 | Mullen |
| 2006/0256133 A1 | 11/2006 | Rosenberg et al. |
| 2007/0098234 A1 | 5/2007 | Fiala |
| 2007/0182812 A1 | 8/2007 | Ritchey |
| 2008/0102947 A1 | 5/2008 | Hays et al. |
| 2008/0147488 A1* | 6/2008 | Tunick ............... G06Q 30/0273 705/7.29 |
| 2008/0180352 A1 | 7/2008 | Modir et al. |
| 2009/0019472 A1 | 1/2009 | Cleland et al. |
| 2009/0062629 A1 | 3/2009 | Pradeep et al. |
| 2009/0112694 A1 | 4/2009 | Jung et al. |
| 2009/0161963 A1* | 6/2009 | Uusitalo ............... G06F 16/748 382/203 |
| 2009/0177528 A1 | 7/2009 | Wu et al. |
| 2009/0204484 A1 | 8/2009 | Johnson |
| 2010/0091139 A1 | 4/2010 | Sako et al. |
| 2010/0191631 A1 | 7/2010 | Weidmann |
| 2010/0249636 A1 | 9/2010 | Pradeep et al. |
| 2011/0018903 A1 | 1/2011 | Lapstun et al. |
| 2011/0060653 A1 | 3/2011 | King et al. |
| 2011/0085700 A1 | 4/2011 | Lee |
| 2011/0161160 A1 | 6/2011 | Carlson et al. |
| 2011/0166942 A1 | 7/2011 | Vassilvitskii et al. |
| 2011/0213664 A1 | 9/2011 | Osterhout et al. |
| 2011/0234475 A1 | 9/2011 | Endo |
| 2011/0258049 A1* | 10/2011 | Ramer ............... G06Q 30/0273 705/14.66 |
| 2012/0075168 A1* | 3/2012 | Osterhout ............... G06F 3/011 345/8 |
| 2012/0229909 A1 | 9/2012 | Clavin et al. |
| 2013/0106674 A1 | 5/2013 | Wheeler et al. |
| 2015/0121506 A1 | 4/2015 | Cavanaugh |
| 2016/0217623 A1 | 7/2016 | Singh |

OTHER PUBLICATIONS

Hartberger, R., H&C Coffee History. Quality Coffee Company. 2006. Web. Mar. 4, 2010. <http://www.qualitycoffee.com/hchistory.htm>.

Loeffler, W. 100 years later, neon still glowing bright. McClatchy—Tribune Business News. Nov. 9, 2008. Web. Dec. 5, 2013 <http://search.proquest.com/docview/456859242?accountid=14753>.

Mackie, John., "Signs from Vancouver's Neon Age Stand the Test of Time." The Vancouver Sun: 0. Oct. 6, 2003. ProQuest. Web. Dec. 5, 2013 <http://search.proquest.com/docview/242386453?accountid=14753>.

Mullen, M., Heinz to Light Up the Night With Refurbished Ketchup Sign. Heinz Online Newsroom. Nov. 5, 2007. Business Wire. Web. Dec. 5, 2013 <http://news.heinz.com/press-release/general/heinz-light-night-refurbishedketchup-sign>.

Starner, Thad; "The Challenges of Wearable Computing: Part 1"; Georgia Institute of Technology; IEEE; Jul.-Aug. 2001.

Starner, Thad; "The Challenges of Wearable Computing: Part 2"; Georgia Institute of Technology; IEEE; Jul.-Aug. 2001.

Unpublished U.S. Appl. No. 13/292,893, filed Nov. 9, 2011 entitled "Valuing Advertisement pace Based on Gaze Data".

Unpublished U.S. Appl. No. 13/292,898, filed Nov. 9, 2011 entitled "Marketplace for Advertising Space Using Gaze-Data Valuation".

Unpublished U.S. Appl. No. 13/292,904, filed Nov. 9, 2011 entitled "Real-Time Targeting of Advertisements Based on Gaze Direction".

Unpublished U.S. Appl. No. 13/428,964, filed Mar. 23, 2012 entitled "Gaze-Data Based Targeting of Advertising in Wearable Display".

Unpublished U.S. Appl. No. 13/474,970, filed May 18, 2012 entitled "Real-Time Trading of Gaze-Based Advertisement Opportunities".

Unpublished U.S. Appl. No. 13/428,979, filed Mar. 23, 2012 entitled "Feedback to Inform of Learnt Advertising Preferences".

Unpublished U.S. Appl. No. 13/478,218, filed May 23, 2012 entitled "Removal of Biometric Data from Gaze Data".

Unpublished U.S. Appl. No. 13/428,991, filed Mar. 23, 2012 entitled "Placement of Advertisements in See-Through Display of a Head-Mountable Device".

Unpublished U.S. Appl. No. 13/419,783, filed Mar. 14, 2012 entitled "Distributing Advertisements in a Wearable Display".

Unpublished U.S. Appl. No. 13/472,902, filed May 16, 2012, entitled "Audio Advertisements Based on Gaze Information".

* cited by examiner

MARKETPLACE FOR ADVERTISEMENT SPACE USING GAZE-DATA VALUATION

CROSS REFERENCE TO RELATED APPLICATIONS

This application is a continuation of co-owned U.S. patent application Ser. No. 15/145,125, filed May 3, 2016, which is a continuation of co-owned U.S. patent application Ser. No. 13/292,898, filed Nov. 9, 2011, both of which are incorporated by reference herein in their entirety and for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary computer-implemented method may involve: (a) receiving a listing request that indicates an offer to sell advertisement rights to an advertisement space, wherein the listing request corresponds to a first user-account; (b) determining an advertisement value for the advertisement space, wherein the advertisement value is based on detected occurrences of the advertisement space in gaze data, wherein the gaze data is received from a plurality of wearable computing devices and is indicative of a respective wearer-view associated with each of the wearable computing devices; (c) in response to the listing request, updating an advertising-space database with a listing for the advertisement space, wherein the listing indicates the advertisement rights are available for purchase at a listing price that is based on the determined advertisement value; and (d) making the listing for the advertisement space available via a network-based advertisement marketplace.

In another aspect, an exemplary advertisement-marketplace system may include a non-transitory computer-readable medium and program instructions stored on the non-transitory computer-readable medium. The program instructions may be executable by at least one processor to: (a) receive a listing request that indicates an offer to sell advertisement rights to an advertisement space, wherein the listing request corresponds to a first user-account; (b) determine an advertisement value for the advertisement space, wherein the advertisement value is based on detected occurrences of the advertisement space in gaze data, wherein the gaze data is received from a plurality of wearable computing devices and is indicative of a respective wearer-view associated with each of the wearable computing devices; (c) in response to the listing request, update an advertising-space database with a listing for the advertisement space, wherein the listing indicates the advertisement rights are available for purchase at a listing price that is based on the determined advertisement value; and (d) make the listing for the advertisement space available via a network-based advertisement marketplace.

In yet another aspect, an exemplary computer-implemented method may involve: (a) receiving an auction-listing request to offer for sale advertisement rights to an advertisement space, wherein the auction-listing request corresponds to a first user-account; (b) determining an advertisement value for the advertisement space, wherein the advertisement value is based on detected occurrences of the advertisement space in gaze data, wherein the gaze data is received from a plurality of wearable computing devices and is indicative of a respective wearer-view associated with each of the wearable computing devices; (c) in response to the auction-listing request, adding a listing for the advertisement space to an advertising-space database, wherein the auction listing indicates that the advertisement rights are available for purchase via an auction process, wherein the auction process is based at least in part on the determined advertisement value; and (d) making the auction listing for the advertisement space available via a network-based advertisement marketplace.

In a further aspect, an exemplary computer-implemented method may involve: (a) receiving a valuation request that identifies an advertisement space for valuation, wherein the valuation request is associated with a user-account; (b) determining an advertisement value for the advertisement space, wherein the advertisement value is based on detected occurrences of the advertisement space in gaze data, wherein the gaze data is received from a plurality of wearable computing devices and is indicative of a respective wearer-view associated with each of the wearable computing devices; (c) based at least in part on the determined advertisement value, determining a listing price for the advertisement space; and (d) in response to the valuation request, sending an indication of the determined listing price.

In yet a further aspect, an exemplary computer-implemented method may involve: (a) searching gaze data from a plurality of wearable computing devices to detect any occurrence of an advertisement space in the gaze data, wherein the gaze data from each wearable computing device is indicative of a wearer-view associated with the wearable computing device; (b) in response to detecting one or more occurrences of a given advertisement space in the gaze data, determining that the given advertisement space is an unlisted advertisement space; and (c) in response to determining that the given advertisement space is unlisted: (i) determining a user-account that is associated with the given advertisement space and (ii) determining an advertisement value for the given advertisement space, wherein the advertisement value is based on the one or more detected occurrences of the given advertisement space in the gaze data; and (d) sending an indication of an ad-space suggestion to the user-account, wherein the indication of the ad-space suggestion indicates a listing price for at least the given advertisement space, wherein the listing price is based on the determined advertisement value.

In an additional aspect, an exemplary computer-implemented method may involve: (a) receiving a search request associated with a first user-account, wherein the search request indicates to search for advertisement spaces associated with the first user-account; and (b) in response to the search request: (i) searching gaze data from a plurality of wearable computing devices to detect any occurrence of any advertisement space associated with the first user-account, wherein the gaze data from each wearable computing device is indicative of a wearer-view associated with the wearable computing device; and (ii) in response to detecting at least one occurrence of one or more associated advertisement spaces in the gaze data, sending a search result message to the first user-account, wherein the search result message indicates the one or more associated advertisement spaces.

In another aspect, an exemplary computer-implemented method may involve: (a) receiving a purchase-interest indication associated with an first user-account, wherein the purchase-interest indication indicates an advertisement space; (b) determining an advertisement value for the advertisement space, wherein the advertisement value is based on detected occurrences of the advertisement space in gaze data, wherein the gaze data is received from a plurality of wearable computing devices and is indicative of a respective wearer-view associated with each of the wearable computing devices; (c) identifying a second user-account that is associated with the advertisement space; and (d) sending an purchase-interest notification to the second user-account, wherein the purchase-interest notification indicates a listing price for the advertisement space that is based on the determined advertisement value.

These as well as other aspects, advantages, and alternatives, will become apparent to those of ordinary skill in the art by reading the following detailed description, with reference where appropriate to the accompanying drawings.

DETAILED DESCRIPTION

Figure 1:
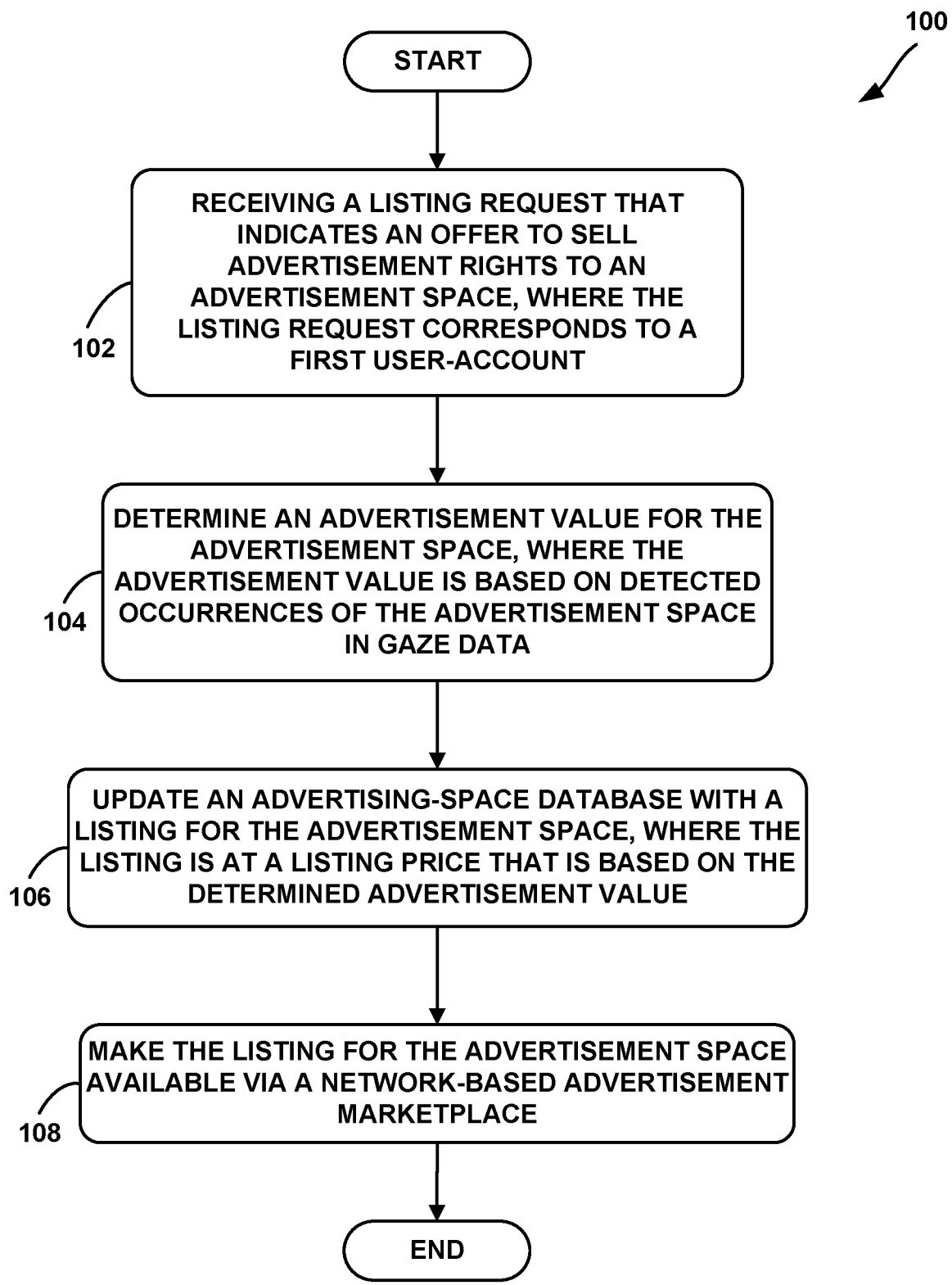
FIG. 1 is a flow chart illustrating a method according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

A. Valuing Advertisement Space Based on Gaze Data

Many existing methodologies for valuing physical advertising space involve use of different types of data to estimate how many people view an advertisement space (referred to interchangeably as an "ad space") and/or how effective the advertisement space is at delivering the intended message to the viewer. These methodologies often rely on demographic information and other such indirect measurements of the potential audience for an advertisement space. Since these methodologies only estimate how many people actually view an advertisement space and/or who the people are that actually view the advertisement space, and do not incorporate actual viewership data, the results are often inaccurate.

Some existing valuation techniques do incorporate actual viewership data, which is typically collected for a test group and then extrapolated to the population as a whole (or to a larger group, such as a target market). However, gathering such viewership data with existing methodologies can often be time-consuming and difficult. For example, such techniques often involve polling people in a test group individually or laboriously observing how many people actually view an advertisement space (e.g., counting vehicles that pass by a billboard). Because of the effort required, advertising is typically limited to certain defined types of spaces (e.g., billboards, television commercials, websites, etc.) for which representative viewership data can be most-readily obtained.

Since most any physical space that is seen by people has some value for purposes of advertising, current valuation techniques do not allow for capitalization of many would-be advertising spaces. While the individual values of such spaces may be small, the cumulative value of all such spaces may be significant. However, due to the limitations of current advertisement valuation and marketing techniques, much of the potential value of such spaces has not been monetized.

Accordingly, exemplary methods and systems may help to determine the value of advertising spaces in a manner that may be more accurate, and may require less data-collection effort than existing advertisement-valuation techniques. In particular, exemplary methods may utilize "gaze data," from a number of wearable computers, which is indicative of what the wearers of the wearable computers are actually viewing, in order to value physical spaces.

For example, point-of-view (POV) videos from a number of wearable computers may be analyzed in order to determine how frequently a certain space is captured in the POV videos. Notably, POV video from wearable computers may provide a fairly accurate indication of what a user is actually looking at. Therefore, aggregating such POV videos from a number of users may help to more accurately value advertising rights to physical spaces. Additionally, the wearers of the wearable computing devices may elect to make their respective user-profiles available, such that individual characteristics of each wearer who views an advertisement space may be considered. This information may then be used to determine the value of the physical space.

Furthermore, a cloud-based server system may aggregate gaze data from many wearable computers, and use the gaze data to determine wearer-view data for various advertisement spaces. As such, an exemplary embodiment may provide advertisement valuation that is carried out automatically, without the effort required for manual data collection, and is more accurate, as the valuation is based on data that more-accurately captures what people are actually viewing.

Advantageously, exemplary methods and systems may automatically collect wearer-view data for a large number of advertisement spaces. This may allow for valuation and monetization of many physical spaces that have value for purposes of advertising, and might not otherwise be capitalized.

For example, the shortcomings of existing advertisement valuation are especially problematic when it comes to individuals who wish to associate themselves with a brand or product (e.g., individuals who wish to be sponsored). Because of the cost and/or effort involved in using common valuation techniques to gather viewership data for the average person, sponsorship is generally limited to high-visibility individuals (e.g., famous athletes and musicians). Such high-visibility individuals are typically the most valuable to an advertiser, such that the cost of evaluating the sponsorship is justified by the value to the advertiser. For instance, a famous race-car driver can readily sell advertising space on his or her clothing or on their car. However, there is no market for the average person to do the same (in fact, individuals often pay more to have a brand logo on their clothing). Typically, however, there is still value to the average person promoting a product in this manner. Advantageously, by economically and accurately determining the advertisement value of physical spaces associated with the average person, an exemplary embodiment may help open up sponsorship opportunities for almost anyone.

However, it should be understood that exemplary embodiments may generally be used to value almost any type of physical space. To provide just a few examples, advertisement values may be determined for: (a) the back of the screen of a laptop computer, (b) an article of clothing, (c) a billboard, (d) a surface on an automobile, (e) a body surface, (f) a space on a webpage, (g) a print advertisement space, (h) a surface on product packaging, and/or (i) a pet. Many other types of advertisement spaces may also be valued utilizing an exemplary embodiment.

Further, an exemplary methods and systems may be used to value physical spaces types for various different advertisement formats such as: (a) print advertisements, (b) computer-generated images, (c) video, (d) peel and stick paper advertisements, (e) two-dimensional projections, (f) a three-dimensional projections, (g) iron-on images, (h) temporary tattoos, and/or (i) other advertising formats.

B. Advertisement Marketplace

Provided with the ability to determine an advertising value for almost any physical space, there is a need for a marketplace system to facilitate transactions involving use of such physical spaces as advertisement spaces. Accordingly, exemplary methods and systems may help to provide an advertisement marketplace.

In an exemplary marketplace, gaze-data-based valuation may be used to price advertising rights. For instance, in some applications, advertisement rights to an advertisement space may be listed at the advertisement value, or at a fixed rate that is based on the advertisement value. In other instances, advertisement rights may be listed at a variable rate. For example, an initial rate may be based on the advertisement value at or near the time of purchase. The system may then adjust this rate based on views of the advertisement during the advertising period (e.g., based on how often the advertisement space is detected in subsequent gaze data). Other gaze-data-based pricing structures for advertisement spaces are also possible.

Note that in an exemplary embodiment, the advertisement value upon which the listing price is based may be a "relative advertisement value." More specifically, the relative advertisement value may be determined pre-sale, and thus may differ from the price that the advertisement space ultimately sells for in an open market. For example, a relative advertisement value may be determined for an advertisement space before any advertisement is placed, based on gaze data in which the bare advertisement space is detected. As such, the selling price may ultimately differ based on what the market is willing to pay for the advertisement space. Thus, in some embodiments the true or official advertisement value may be considered to be the market price, and thus may differ from the relative advertisement value.

In some embodiments, an exemplary marketplace may include various features to assist a user who wishes to list an advertisement space for sale in the marketplace. For instance, an exemplary system may support valuation requests, which allows a user to request and be provided with gaze-data-based advertisement values for the user's advertisement spaces. Such valuation requests may help users evaluate whether or not to list an advertisement space in the marketplace. More specifically, once provided with the advertisement value for their advertisement space, a user may then elect to list the advertisement space at a listing price that is based on this advertisement value.

Further, an exemplary system may allow a user to sell advertising rights for a wide variety of physical spaces. For instance, an exemplary system may have pre-defined types of physical spaces that can be valued as an advertisement space and listed for sale (e.g., higher-visibility types of physical spaces such as a billboard, the back of a laptop computer, the front of a shirt, etc.). As such, an exemplary system may automatically search gaze data for the pre-defined types of physical spaces, and in so doing may identify potential advertisement spaces. Once a physical space has been identified as a potential advertisement space, the system may allow a user to sell advertisement rights to the advertisement space via the advertisement marketplace.

An exemplary advertisement marketplace may additionally or alternatively allow a user to dynamically define a physical space as an advertisement space, even if it is not pre-defined as such. For instance, the system may provide features via which a user can submit images, video, and/or other information that allows the system to detect when an advertisement space occurs in gaze data. After receiving such information, the system can search for the user-defined advertisement space in gaze data, so that the advertisement space can be valued and/or listed in the advertisement marketplace.

In some embodiments, an exemplary system may provide a user who wishes to list advertisement spaces with suggestions of advertisement spaces that can be listed by the user. In particular, the marketplace system may search gaze data (and possibly other data sources as well) for physical spaces that are associated with the given user and that are usable as advertisement spaces. The system may do so automatically or on request by a given user. In either case, the user may then be provided with suggestions of unlisted advertisement spaces (possibly including valuations of each advertisement space), which the user can list in the advertisement marketplace. This may be particularly useful in the scenario where a user is unaware that a certain physical space is usable as an advertisement space. In this scenario, the suggestions may inform a user of the existence of advertisement spaces that the user was previously unaware of. Of course, ad-space suggestions may be useful in other scenarios as well.

An exemplary system may also include various features to assist an advertiser who wishes to purchase an advertisement space. For instance, a marketplace system may allow an advertiser to search, browse, and/or purchase advertisement spaces that are listed in the marketplace.

Furthermore, an exemplary system may allow an advertiser to identify or define an advertisement space for which they are interested in purchasing advertisement rights. In this regard, the advertiser may be provided with similar features as those provided to a user wishing to list an advertisement space, which allow the advertiser to dynamically define a physical space as an advertisement space, and/or to identify a pre-defined type of advertisement space. Once an advertisement space has been identified, the marketplace system may identify a user that is authorized to list the advertisement space, and notify the user that there is interest in their advertisement space.

In a further aspect, an exemplary marketplace may include features to facilitate a transaction to purchase advertisement rights between the user who listed the advertisement space and the advertiser who is purchasing the advertisement space. The advertisement marketplace may also facilitate completion of the contract created between the seller and the purchaser after such a transaction. In particular, when an advertiser purchases an advertisement space, an exemplary marketplace system may create and maintain a record of a contract between the advertiser and user who sold the advertisement. The system may also provide features to facilitate performance of the contract. For instance, a server may search gaze data received post-contract to determine that the advertisement specified by the advertiser is being displayed in the advertisement space in accordance with the contract. Further, the system may facilitate billing the advertiser, and possibly even transferring funds between user-accounts for the advertiser and the seller.

Note that herein, when gaze data is said to be associated with a given user-account, it should generally be understood that this gaze data was sent by a device that is associated with the given user-account (e.g., a device that is registered with the user-account). Further, gaze data and/or other information that is associated with a user-account may also be said to be associated with a user since, functionally, associating gaze data or any other data with a user will generally be accomplished by associating the data with the user's user account.

In a further aspect, when a user creates a user-account for which a gaze value may be determined, a user-profile for the user-account may be created as well. The user-profile may include or provide access to various types of information, from various sources, which is related to the user. For simplicity, examples set forth herein may simply refer to a user-account as including the information included in the associated user-profile. However, this should not be read as requiring that a user-account include a user-profile. It is possible, in some embodiments, that a user-account may not have an associated user-profile. Furthermore, herein, the term user-profile may more generally be understood to refer to any information or collection of information related to a given user. As such, a user-profile may be specifically created for a user-account or may simply take the form of data that is associated with a given user.

II. Exemplary Methods

FIG. 1 is a flow chart illustrating a method according to an exemplary embodiment. The method 100 shown in FIG. 1 is described by way of example as being carried out by a server system in order to provide advertisement-marketplace functionality. However, it should be understood that exemplary methods, such as method 100, may be carried out by other systems or combinations of systems, without departing from the scope of the invention.

Method 100 involves the server system receiving a listing request that indicates an offer to sell advertisement rights to an advertisement space, where the listing request corresponds to a first user-account, as shown by block 102. The server system also determines an advertisement value for the advertisement space, as shown by block 104. Further, in response to the listing request, the server system updates an advertising-space database with a listing for the advertisement space, where the listing is at a listing price that is based on the determined advertisement value, as shown by block 106. The server system may also make the listing for the advertisement space available via a network-based advertisement marketplace, as shown by block 108.

In an exemplary embodiment, the advertisement value that is determined at block 104 is based on detected occurrences of the advertisement space in gaze data that is received from a plurality of wearable computing devices. Further, the gaze data from each wearable computing device is indicative of the respective wearer-view associated with the wearable computing device. For example, the gaze data from each wearable computing device may take the form of point-of-view video that is captured at the wearable computing device. As such, the gaze data upon which an advertisement value is based may include a number of point-of-view videos (e.g., a respective point-of-view video from each of the wearable computing devices).

Gaze data may additionally or alternatively take forms other than point-of-view video. For example, the gaze data from a given wearable computing device may take the form of point-of-view images captured by a forward- or outward-facing camera on the wearable computing device. As a specific example, a given wearable computing device may periodically take a picture, and then send the picture to the server system for use in generating wearer view data. To do so, the wearable computing device may analyze point-of-view video for one or more advertisement spaces, and generate a screen capture of the video when and advertisement space detected. The wearable computing device may then send the screen capture to the server system. Other examples are also possible.

Since the gaze data from a given wearable computing device is generally indicative of the wearer-view of the wearable computing device's wearer, the gaze data is generally indicative of what the wearer of the device is actually looking at. Further, since the wearer-view data is based on the gaze data, the wearer-view data is indicative of actual views of the advertisement space by wearers. For instance, the wearer-view data may provide an indication of how many people are looking at a particular advertisement space, which people are actually looking at a particular advertisement space, when people are looking at a particular advertisement space, and/or how long people are actually looking at a particular advertisement space, among other information. As such, the wearer-view data may help to more accurately determine what an advertising space is worth.

Since the gaze data from a given wearable computing device is generally indicative of the wearer-view of the wearable computing device's wearer, the gaze data is generally indicative of what the wearer of the device is actually looking at. Further, since the wearer-view data is based on the gaze data, the wearer-view data is indicative of actual views of the advertisement space by wearers. For instance, the wearer-view data may provide an indication of how many people are looking at a particular advertisement space, which people are actually looking at a particular advertisement space, when people are looking at a particular advertisement space, and/or how long people are actually looking at a particular advertisement space, among other information. As such, the wearer-view data may help to more accurately determine what an advertising space is worth. Methods and systems for determining an advertisement value using gaze data will be described in greater detail with reference to FIGS. 9A, 9B, and 10.

Figure 9A:
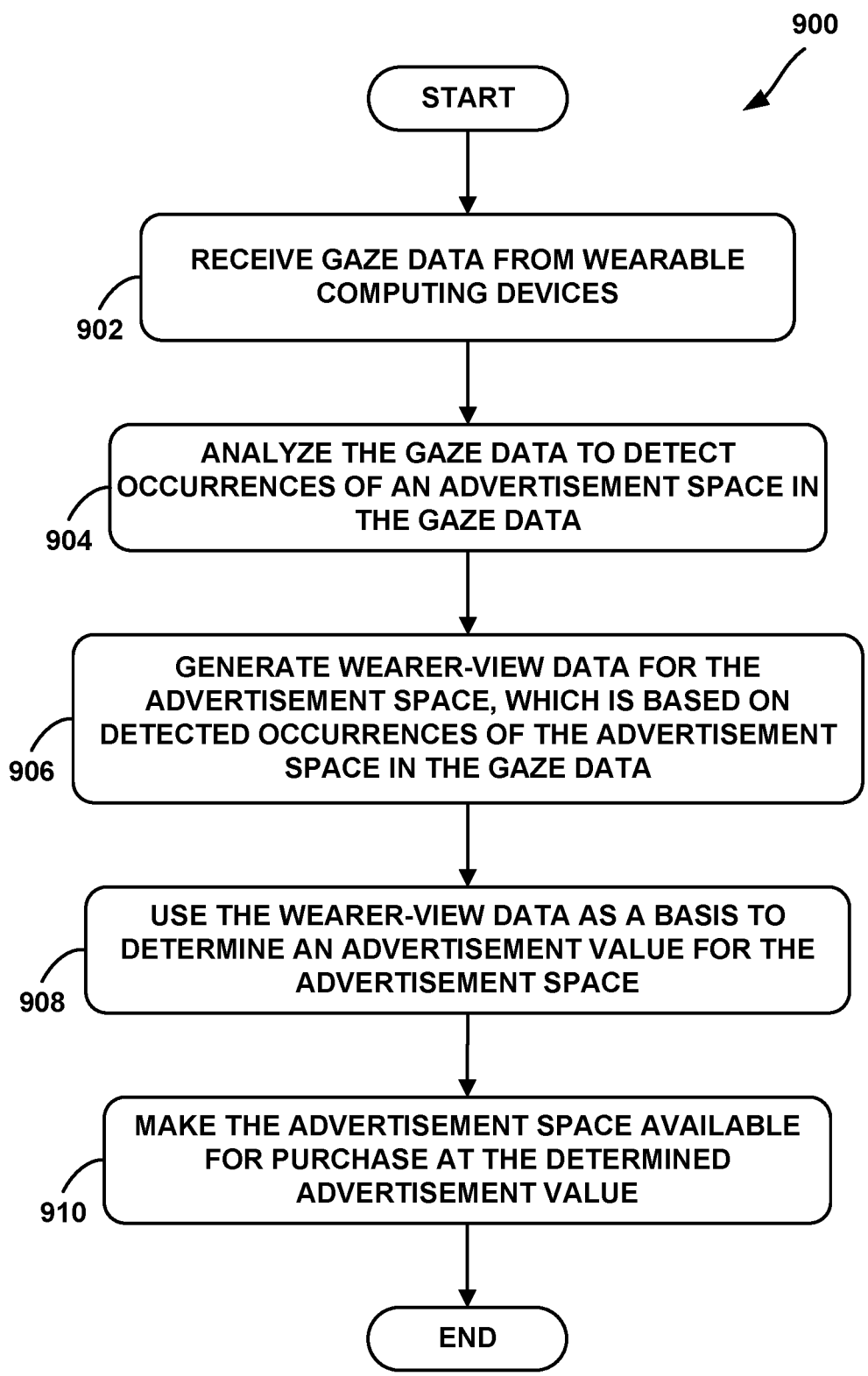
FIG. 9A is a flow chart illustrating a method for determining advertisement value according to an exemplary embodiment.
Figure 9B:
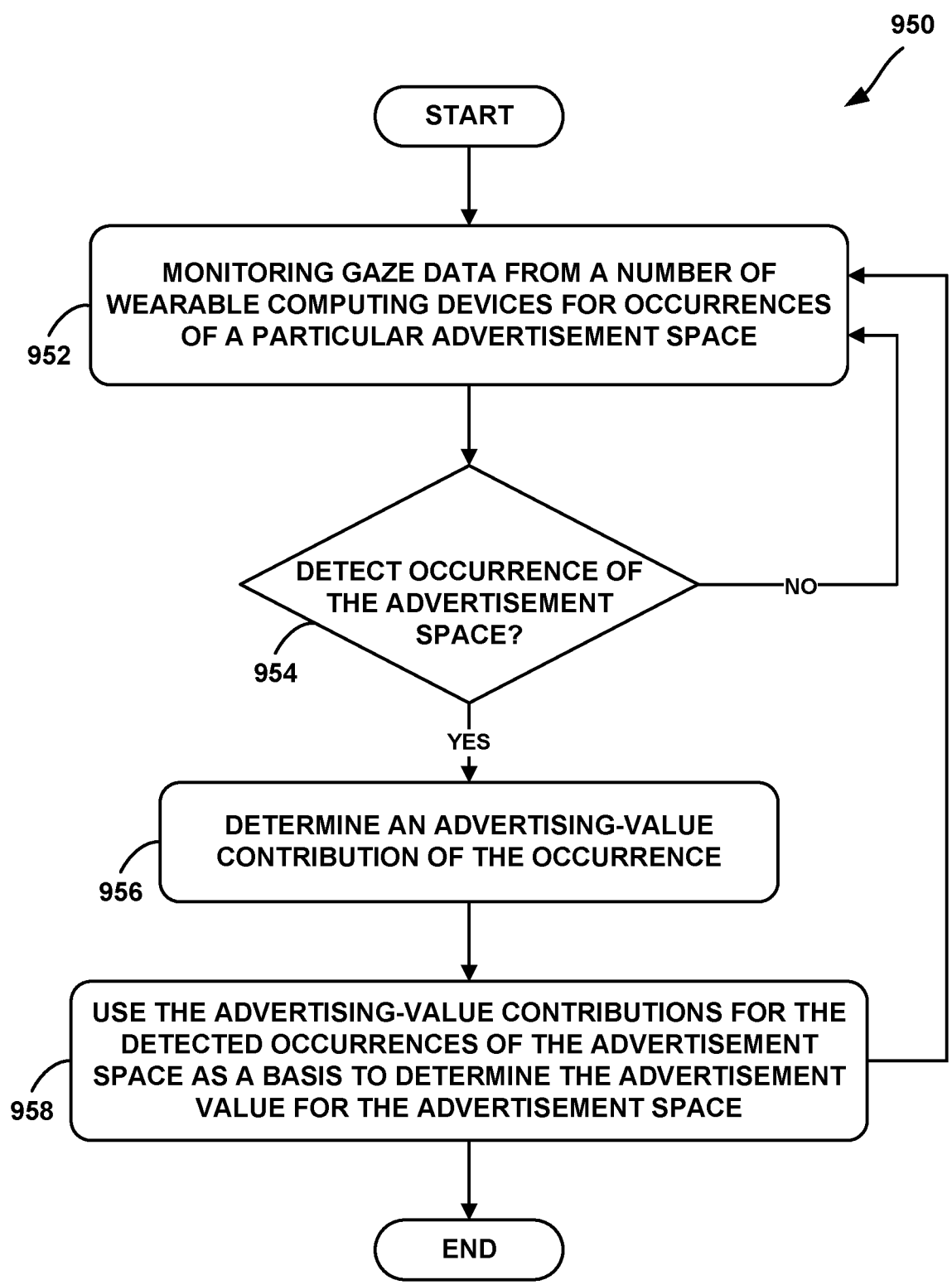
FIG. 9B is a flow chart illustrating another method for determining advertisement value, according to an exemplary embodiment.
Figure 10:
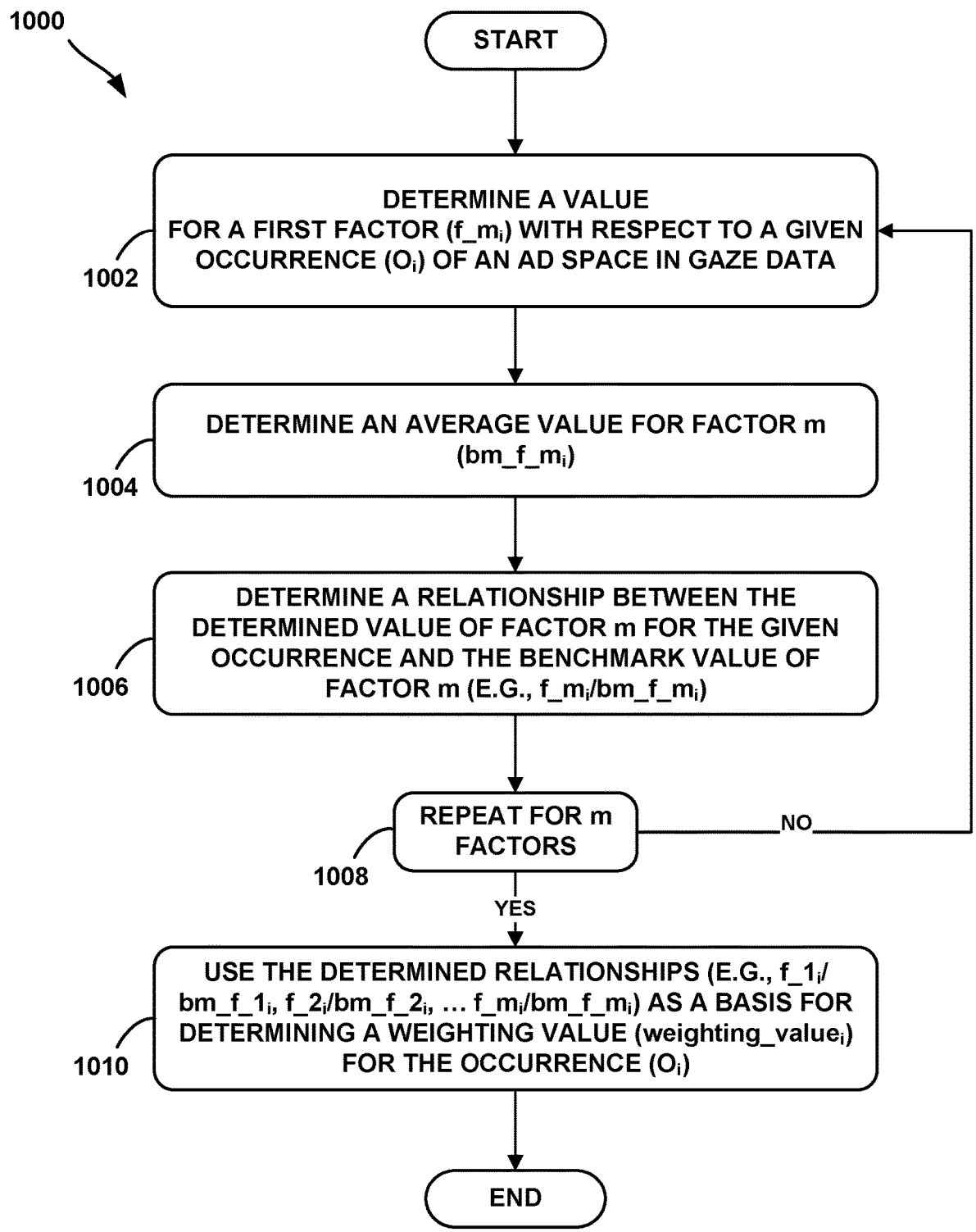
FIG. 10 is a flow chart illustrating a method for using multiple factors to determine the ad-value contribution of a given ad-space occurrence in gaze data, according to an exemplary embodiment.

In some cases, the advertisement value for the advertisement space may have already been calculated when the listing request is received at block 102, using methods such as those described in reference to FIGS. 9A, 9B, and 10. In this case, block 104 may simply involve querying an ad-value database to retrieve the predetermined advertisement value.

In other cases, the advertisement value may not yet have been calculated when the listing request is received at block 102. In such cases, block 104 may involve the server system responsively analyzing gaze data in order to determine the advertisement value, using methods such as those described in reference to FIGS. 9A, 9B, and 10. Note that in some of these cases, analyzing the gaze data may take a considerable amount of time (e.g., more time than a typical user will want to wait, and possibly days, weeks, or even longer). As such, the server system may indicate that time is needed to determine the advertisement value so that the user can choose whether or not to wait for the advertisement value to be determined. If the user elects not to wait, then the server system may notify the user once the advertisement value is determined (e.g., via an indication sent to the user's user-account).

Further, in some cases, even when the advertisement value has been calculated before receipt of the listing request at block 102, the server system may still analyze gaze data at block 104 in order to update the predetermined advertisement value. This may be useful in the event it has a significant amount of time since the advertisement value was determined (e.g., long enough that the advertisement value is likely to have changed based on gaze data received in the interim). This may be the default procedure, or may be triggered when a certain amount of time has passed since the advertisement value was determined (e.g., long enough that the advertisement value is likely to have changed based on gaze data received in the interim). In the latter case, the amount of time that triggers an update to the advertisement value may be set depending upon the goals of the particular implementation.

Exemplary systems will now be described before further details of exemplary methods are set forth.

III. Exemplary Server Systems

Figure 2:
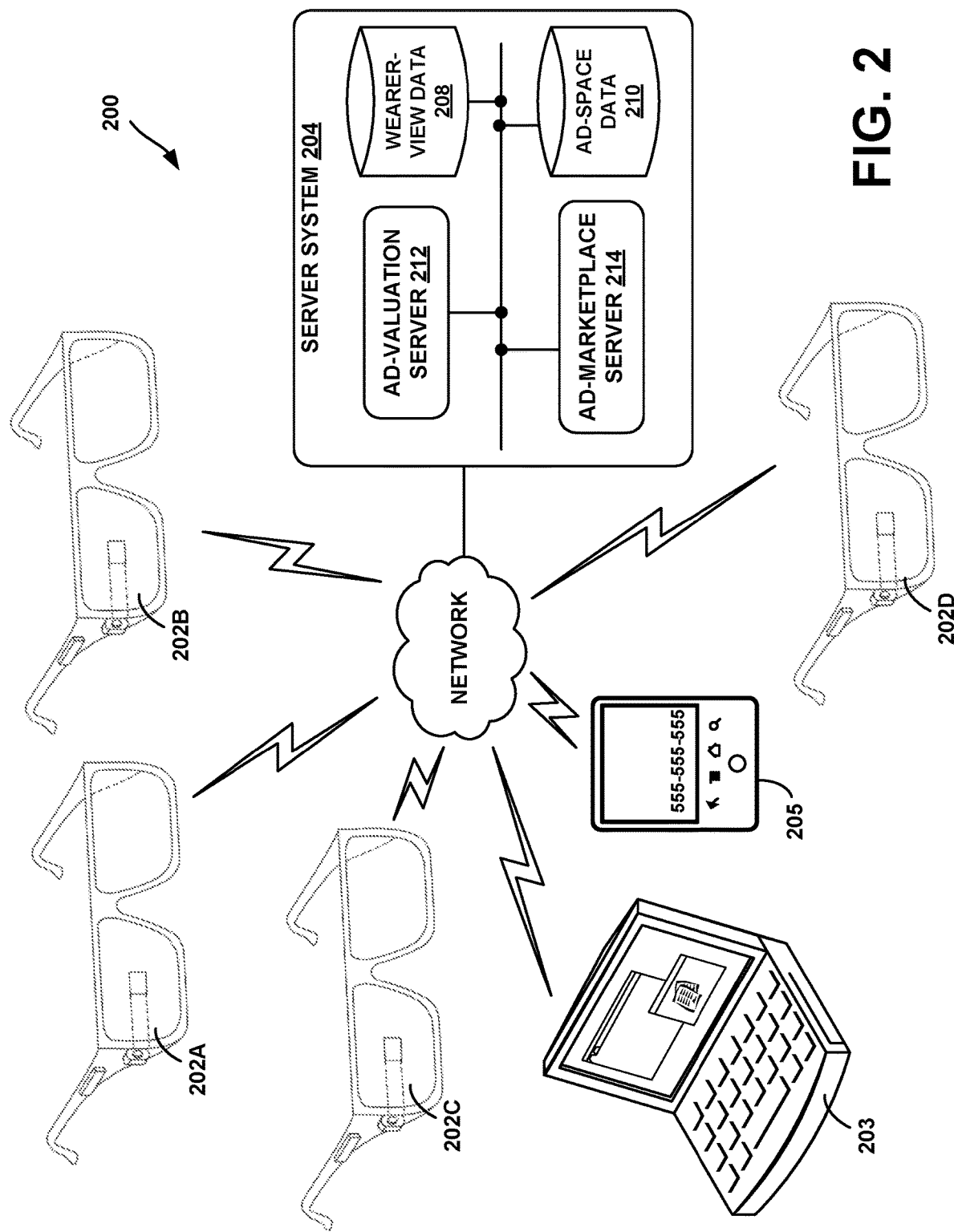
FIG. 2 is a simplified block diagram illustrating a communication network via which gaze data may be received, according to an exemplary embodiment.

FIG. 2 is a simplified block diagram illustrating a communication network via which gaze data may be received, according to an exemplary embodiment. As such, an exemplary advertisement marketplace may be implemented in a network such as communication network 200. As shown, communication network 200 includes a number of wearable computing devices 202A to 202D, which are configured to communicate with a server system 204 via one or more networks 206. An exemplary network, such as communication network 200, may also include computing devices other than wearable computing devices, such as laptop computer 203 and mobile phone 205, for instance.

In order to facilitate an exemplary method, the users of wearable computing devices 202A to 202D may register their respective devices and opt in to programs via which the users submit gaze data from their respective devices. As such, wearable computing devices 202A to 202D may send gaze data to the server system 204, which the server system 204 may then analyze to help determine advertisement values for advertisement spaces, possibly to valuate advertisement spaces as well. Further, in some embodiments, laptop 203, mobile phone 205, and/or other computing devices may provide supplemental gaze data, which may be used by server system 204 to supplement the gaze data from wearable computing devices 202A to 202D.

The server system 204 may be a computing system including one or more computing devices. In particular, server system 204 may be a cloud-based server system that is configured to receive gaze data, to determine advertisement values for advertisement spaces detected in the gaze data, and/or to provide an advertisement-space marketplace for advertising spaces.

As noted, the gaze data in an exemplary embodiment may include point-of-view videos captured by a number of wearable computing devices. For example, some or all of the wearable computing devices 202A to 202D may include or take the form of glasses-style HMDs that each include a forward-facing video camera for taking point-of-view video (e.g., video that generally captures the perspective of a person wearing the HMD). As such, when the HMD is worn, the forward-facing camera will capture video and/or images that are generally indicative of what the wearer of the HMD sees. Note that exemplary glasses-style HMDs will be described in greater detail with reference to FIGS. 11A, 11B, 12A, 12B, and 13.

Further, server system 204 may include or be in communication with an ad-valuation server 212 and an ad-marketplace server 214. In some embodiments, ad-valuation server 212 and ad-marketplace server 214 may be separate server systems, which each include one or more computing devices. In other embodiments, some or all of the functionality attributed to ad-valuation server 212 and ad-marketplace server 214 may be provided by a single server system, which may include one or more computing devices.

In an exemplary embodiment, ad-valuation server 212 may be configured to receive gaze data from wearable computing devices 202A to 202D. Further, ad-valuation server 212 may analyze the received gaze data for occurrences of one or more advertisement spaces, and generate wearer-view data for the advertisement spaces based on occurrences of the advertisement spaces in the gaze data.

In a further aspect, the server system 204 may include or have access to a wearer-view database 208 that includes wearer-view data for a number of advertisement spaces (e.g., advertisement spaces indicated by ad-space database 210). When ad-valuation server 212 generates wearer-view data, ad-valuation server 212 may store the generated data in wearer-view database 208. Accordingly, server system 204 may access the wearer-view database 208 to retrieve wearer-view data for a given advertisement space, which in turn may be used to determine the advertisement value for the given advertisement space.

To assist the server in detecting occurrences of various advertisement spaces in gaze data, advertisement server 204 may include or have access to an ad-space database 210 that includes information that can be used to identify various advertisement spaces. Accordingly, advertisement server system 204 may use the identifying information from advertisement space database 210 to determine when advertisement spaces occur in gaze data from wearable computing devices 202A to 202D. Further, in embodiments that utilize location data for advertisement spaces, ad-space database 210 may also store location information for individual advertisement spaces.

In another aspect, computing devices such as wearable computing devices 202A to 202D, laptop computer 203, and/or mobile phone 205, may be provided with advertisement marketplace functions via the server system 204, and in particular, via ad-marketplace server 214.

As such, ad-marketplace server 214 may be configured to provide an advertisement marketplace via which advertisement spaces that are valued by ad-valuation server 212 can be bought and sold. Further, ad-marketplace server 214 may facilitate transactions between parties in such an advertisement marketplace. For instance, ad-marketplace server 214 and/or other components of server system 204 may support an advertisement marketplace including features for listing advertisement rights to an advertisement space for sale, a bidding system for physical spaces (e.g., auction functionality), organization and indexing of available physical spaces, searching and/or browsing listings for advertisement spaces, tracking usage of advertisement spaces, calculation of fees and other billing functions, and/or portfolio management for sellers and purchasers of advertisement space, among other features.

Further, server system 204 may provide access to an advertisement marketplace via a website, via a standalone application, and/or via other points of access. Data related to listings and/or transactions in the advertisement marketplace may then be stored in ad-space database 210.

IV. Exemplary Terms and Conditions of Sale in an Advertisement Marketplace

In an exemplary method, such as method 100, a listing request may take various forms and/or include various different types of information, depending upon the embodiment. For example, a listing request may include data that: (a) identifies and/or defines the advertisement space to be listed, (b) identifies the user-account to be associated with the listing, (c) data demonstrating that the user-account is authorized to list the advertisement space, (d) data defining the terms and conditions under which the advertisement rights are being offered, and/or (e) other types of data related to the requested listing and/or the user account.

In a further aspect, an exemplary system may allow for certain conditions to be placed on a listing. Accordingly, an exemplary method may further involve receiving, in conjunction with the listing request, one or more condition indications which each indicate a condition of the advertisement rights offered in the listing for the advertisement space. Such condition indications may be included in the listing request, or received separately from the listing request. Examples of conditions that may be specified may include: (a) a time period for which the advertisement rights will be provided, (b) a portion of the advertisement space to be provided, (c) one or more timeshare conditions, and (d) an advertisement-type restriction for the advertisement space. Others types of conditions are also possible.

Furthermore, an exemplary system may allow a listing to be created for a certain type of contract or agreement. Functionally, the contract may specify a set of conditions that define the advertisement rights that will be provided when an advertiser purchases the advertisement rights. For example, a listing may specify a contract for:

(a) A sale transferring ownership of the advertisement space from the first user-account to the second user-account.

(b) An exclusive lease of the advertisement space (e.g., an agreement conveying all advertisement rights for the term of the lease, such as a day, month, year, and so on).

(c) A partial exclusive lease of the advertisement space (e.g., an agreement conveying all advertisement rights for a portion or portions of the term of the lease, such as between 4:00 pm and 6:00 pm every day during a month-long lease).

(d) A timeshare lease of the advertisement space (e.g., an agreement to conveying the right to have an advertisement displayed in a rotation with other advertisements, without any specific time period being set aside for a given one of the advertisements in the rotation).

Other types of contracts or agreements are also possible. Further, in some embodiments, an advertisement marketplace may provide pre-defined contracts, which can be selected by a user for a listing. Additionally or alternatively, an advertisement marketplace may allow a user to create a custom contract by specifying the terms and conditions desired by the user. Further, in some embodiments, an advertisement marketplace may allow a user to create a custom contract by modifying a pre-defined contract. In a further aspect, an exemplary system may be configured to facilitate a transaction for the advertisement rights to an advertisement space that was listed using a method such as method 100. For example, an exemplary system may be configured to receive a purchase request from a second user-account, which indicates a desire to purchase a listing from a first user-account. In response to such a request, an exemplary system may facilitate a transaction for the advertisement rights to the advertisement space by, e.g., creating a contract for the advertisement rights as specified in listing, between the first user-account and the second user-account.

V. Exemplary Pricing in an Advertisement Marketplace

In an exemplary advertisement marketplace, various types of pricing may be implemented. In some embodiments, all advertisement spaces may be listed with the same pricing structure. In other embodiments, different advertisement spaces may be listed with different pricing structures. Further, in some embodiments, a single listing for an advertisement space may offer multiple types of pricing structures, so that a purchaser of the advertisement space can select the pricing structure that fits their needs.

Examples of possible pricing structures include: (a) various types of fixed-rate pricing, (b) various types of variable-rate pricing, and/or (c) various types of auction-based pricing. It should be understood that other pricing structures may additionally or alternatively be incorporated, without departing from the scope of the invention.

In a further aspect, in order to help provide more accurate pricing for advertisement spaces, an exemplary system may extrapolate from the occurrences of an ad-space that are detected in gaze data to estimate how many views occurred in the viewing population as a whole. The advertisement value and/or the price based on the advertisement value may therefore take into account the estimated number of views by the viewing population. This may be useful as there may be many cases where those that view an advertisement space are not wearing a wearable computer that is configured to provide gaze data, and/or where a wearable computer does not capture an advertisement that is viewed by its wearer. As one specific example, consider the case where it is assumed that one out of every thousand views will be captured in gaze data. In this case, if the value of ten occurrences that are detected in gaze data during a one-month period is determined to be $100, the server system may estimate are 10,000 views that are worth $10 each. As such, the advertisement value based on all views may be determined to be $100,000 per month. Other examples are also possible.

Note that in some instances, the extrapolation from the occurrences in gaze data may assume that the users who provide gaze data are generally representative of the viewing population as a whole. However, it is also possible that the users who provide gaze data (e.g., those who own wearable computers and opt in to a program to share gaze data) may not be representative of the viewing population as a whole. In this case, an exemplary system may be configured to account for such differences when extrapolating from the gaze data. The particular techniques used to determine a total number of ad-space views based on the occurrences detected in gaze data may vary from application to application, depending on the characteristics of the viewing population, the demographics of those who provide gaze data, and/or other factors.

In a further aspect, demographic biases created by differences between wearable-computing-device wearers and the population as a whole (or a certain subset of the population) may also be accounted for when calculating individual ad-value contributions upon which the advertisement value is ultimately based. For example, consider a town or another geographic region where an "over-55" age group is known to make up 60% of the viewing population as a whole, but only makes up 12% of the wearable-computing-device users in that area (as indicated by registered wearers of the given age group and/or observed occurrences of an ad space in gaze data from wearers in the age group). Accordingly, when determining the value for an advertisement space in this town, the data from the 12% of wearers who are in the over-55 age group may be given a 60% weight, while the data from the other 88% of wearers from which gaze data is received may be given a 40% weight. Many other examples are also possible.

In yet another aspect, users who are selling advertisement rights to their ad spaces may be provided options to control and/or affect what types of advertisements are displayed in their ad space and/or the terms under which certain advertisers can advertise in their advertisement space. For example, a certain user might not want a certain type of advertisement in their advertisement space for moral or ethical reasons, or for any other reason, and might specify that there advertisement space cannot be used for this type of advertisement, or might indicate that the listing price and amount charge should be higher for this type of advertisement. For example, a user who does not like the idea of an advertisement for an alcoholic beverage in their advertisement space, may specify that such an advertisement should cost three times the standard rate (e.g., the relative advertisement value) for their ad space. As another example, a user who is a fan of a particular electronics company may want an advertisement from the company in their ad space, and therefore may specify that this company should be charged half of the standard rate for their advertisement space. Many other examples are also possible.

A. Fixed-Rate Pricing

As noted, fixed-rate pricing may be used for advertisement spaces in an exemplary advertisement marketplace. For example, in some instances, the server system may simply set the listing price for advertisement rights at the gaze-data based advertisement value. According, when a method such as that described in reference to FIGS. 9A, 9B, and 10 is used to determine the advertisement value for an advertisement space, performing the method may effectively determine the listing price at which the advertisement space can be listed.

In some cases, the price at which an advertisement space can be listed may differ from the determined advertisement value. However, the listing price may still be set to a fixed value or fixed rate that is based on the advertisement value for the advertisement space. In particular, the rate for a fixed-price listing may be adjusted according to the terms and conditions specified by the listing. For example, if an advertisement value is determined in terms of dollars per month, and a listing request specifies that the advertisement space can be purchased on a day-to-day basis, the system may calculate a daily rate that is based at least on part on the monthly advertisement value.

As another example, an advertisement value may be determined with the assumption of exclusive use for a certain term. In this case, if the listing specifies that the advertisement space can be purchased on a timeshare basis (e.g., placing an advertisement in a rotation with other advertisements), the rate at which the timeshare rights to the advertisement space can be listed may be derived from the advertisement value for exclusive use. For example, the advertisement value may be divided by the number of shares to determine the rate for one share of the timeshare. For instance, consider an advertisement space for which exclusive use is valued at $30.00 per month. If the owner wishes to offer this advertisement space as a timeshare to be split between ten advertisers, each share may be listed at $3.00 per month. Other techniques for determining a timeshare price based on an advertisement value that assumes exclusive use are also possible.

More generally, many different techniques may be implemented to account for variations from the advertisement value due to terms and conditions of a listing. Furthermore, the manner in which the advertisement value is used to determine the price for a listing may vary based on other factors and/or for other reasons, without departing from the scope of the invention.

B. Variable-Rate Pricing

As noted, variable-rate pricing may be used for advertisement spaces in an exemplary advertisement marketplace. In particular, the listing price may be a variable rate that is based on the advertisement value for the advertisement space.

For example, at an initial time of the listing, the variable rate may be set equal to or based on the advertisement value. The server system may subsequently update the variable rate based at least in part on gaze data that is received after the initial time of the listing.

Figure 3A:
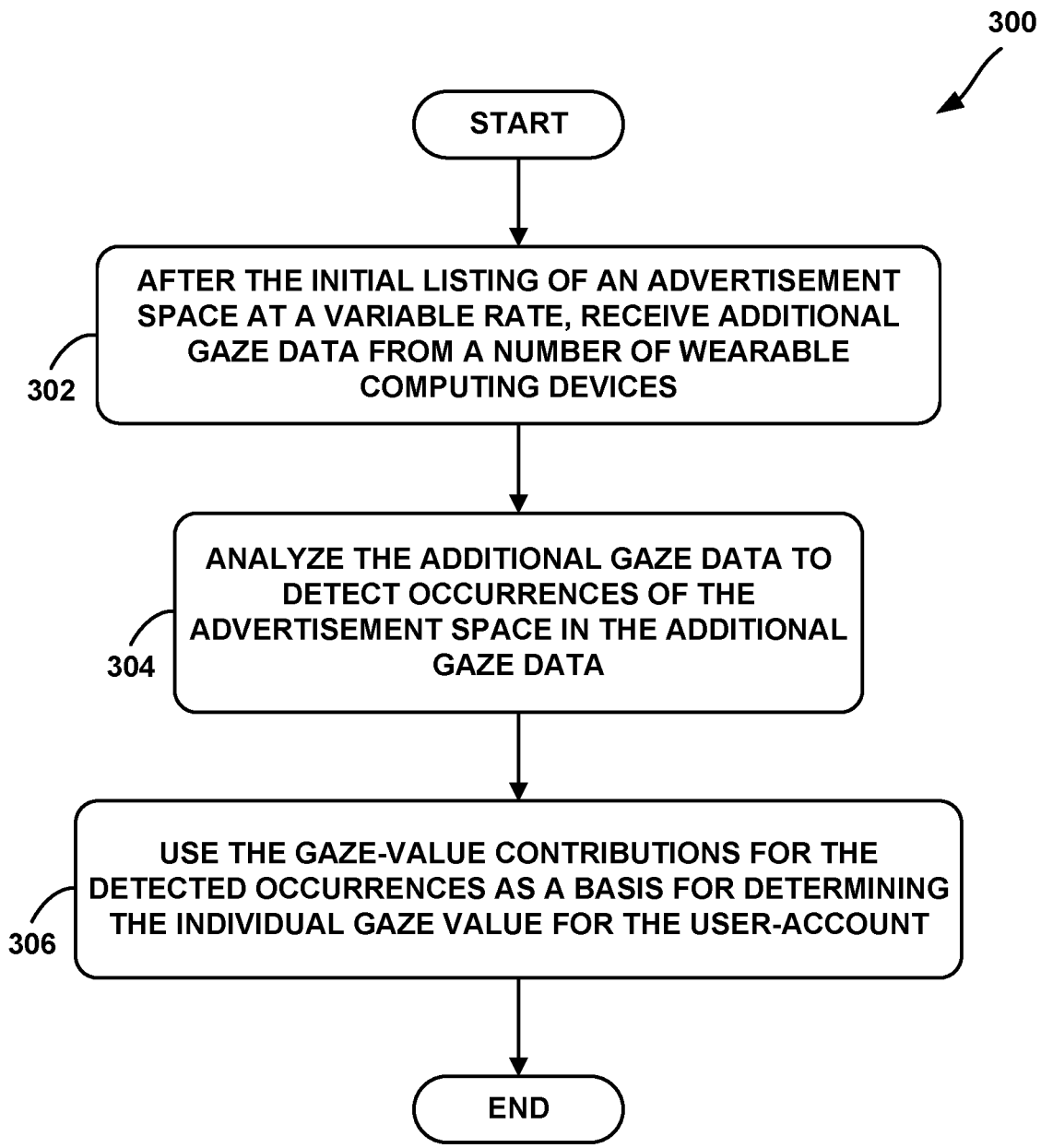
FIG. 3A is a flow chart illustrating a method for updating a variable rate for advertisement rights, according to an exemplary embodiment.

FIG. 3A is a flow chart illustrating a method for updating a variable rate for advertisement rights, according to an exemplary embodiment. The method 300 shown in FIG. 3A is described by way of example as being carried out by a server system to provide the described functionality. However, it should be understood that method 300 may be carried out by other systems or combinations of systems, without departing from the scope of the invention.

Method 300 may be carried out by a server system after the initial time when a listing for advertisement rights to an advertisement space was made available. More specifically, at some point after the initial listing, the server system may receive additional gaze data from a plurality of wearable computing devices, as shown by block 302. The server system may analyze the additional gaze data to detect occurrences of the advertisement space in the additional gaze data, as shown by block 304. The server may then update the variable rate based at least in part on occurrences of the advertisement space in the additional gaze data, as shown by block 306.

The server may use various techniques to update the variable rate at block 306. In some embodiments, the server may use the occurrences of the advertisement space in the additional gaze data to update the advertisement value for the advertisement space. The server can in turn use the updated advertisement value as a basis for updating the variable rate. For instance, taking into account the additional gaze data, the server may implement a method such as that described in FIGS. 9A, 9B, and 10 to update the advertisement value for the advertisement space.

Figure 3B:
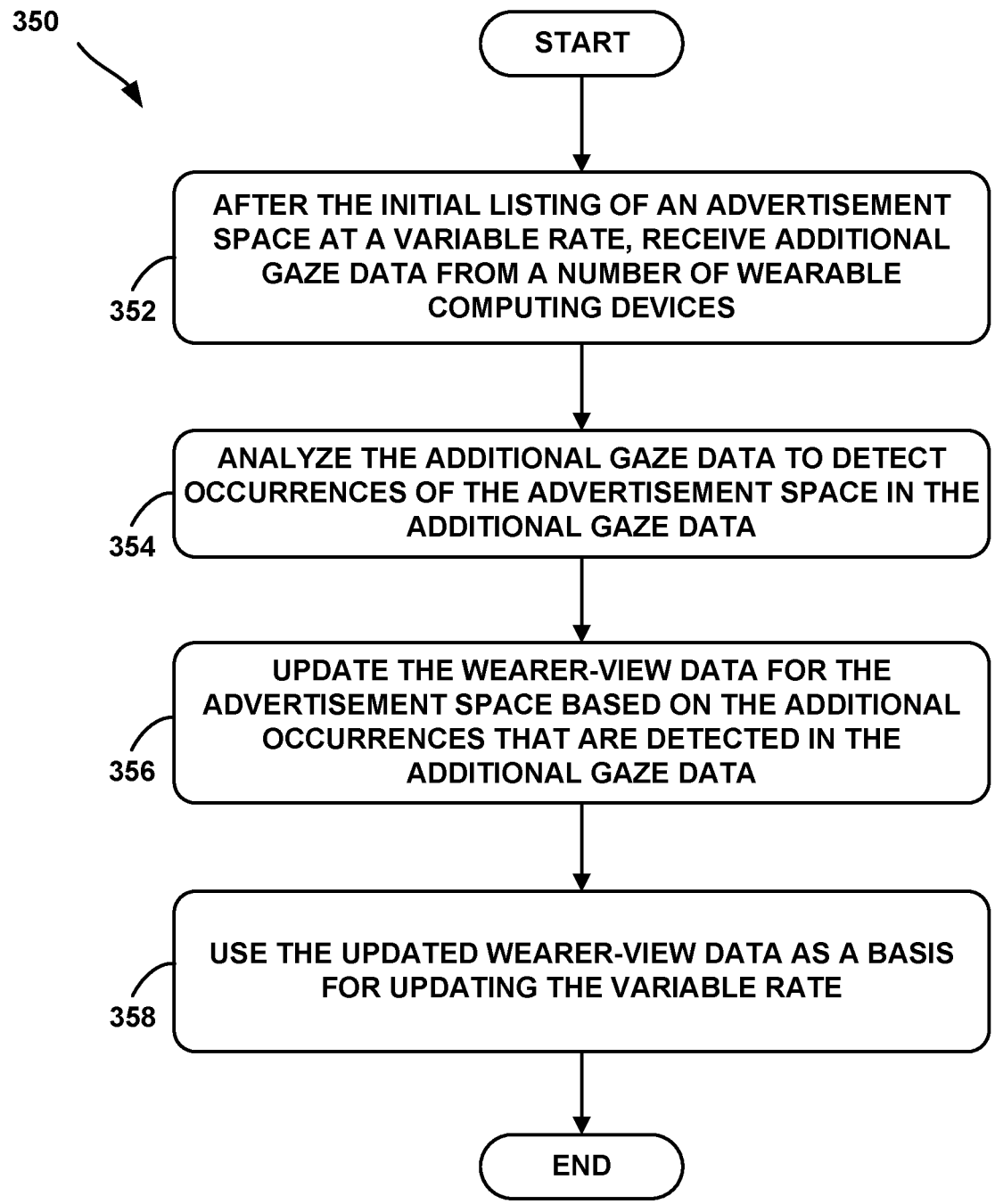
FIG. 3B is a flow chart illustrating another method for updating a variable rate for advertisement rights, according to an exemplary embodiment.

FIG. 3B is a flow chart illustrating another method for updating a variable rate for advertisement rights, according to an exemplary embodiment. The method 350 shown in FIG. 3B is described by way of example as being carried out by a server system to provide the described functionality. However, it should be understood that method 350 may be carried out by other systems or combinations of systems, without departing from the scope of the invention.

Method 350 may be implemented in a scenario where the advertisement value upon which the listing price is initially based, is based on wearer-view data. Further, the wearer-view data upon which the advertisement value is based, is in turn based on the detected occurrences of the of the advertisement space in gaze data. In addition, like method 300 of FIG. 3A, method 350 of FIG. 3B may be carried out by a server system after a listing for advertisement rights to an advertisement space is made available.

More specifically, after a listing has been made available in the advertisement marketplace, the server system may receive additional gaze data, as shown by block 302. The server may then analyze the additional gaze data to detect additional occurrences of the advertisement space in the gaze data, as shown by block 304. As such, the server may update the wearer-view data for the advertisement space based on the additional occurrences that are detected in the additional gaze data, as shown by block 306. The server may then use the updated wearer-view data as a basis for updating the variable rate, as shown by block 308.

In an exemplary embodiment, at block 308, the server may use the updated wearer-view data to update the advertisement value, and in turn use the updated advertisement value to update the variable rate. For instance, taking into account the additional gaze data, the server may implement a method such as that described in FIGS. 9A, 9B, and 10 to update the wearer-view data and in turn the advertisement value for the advertisement space.

In a further aspect of an exemplary method, such as method 300 or 350, the updated advertisement value may be based solely on the additional gaze data, or may take into account some or all of previously-received gaze data as well as the additional gaze data. As such, updating the advertisement value may involve re-determining the advertisement value using only data received between the current and previous instance in which the advertisement value was determined. By using this approach, the server is effectively "starting from scratch" each time it updates the advertisement value, as none of the gaze data that was previously used to determine the advertisement value, will be used to when re-determining the advertisement value. Alternatively, the server may combine the additional gaze data with some or all of the previously received data, and use this combination of gaze data to update the advertisement value.

In some implementations, an advertiser may be charged for an advertisement space on a per-occurrence basis. In such an embodiment, the server may search gaze data to detect any occurrences of an advertisement space, and determine an ad-value contribution of each detected occurrence. The server may then use the ad-value contributions for detected occurrences of the advertisement space to determine the amount to be charged for the user-account.

For example, consider an implementation where an advertiser pays for advertisement rights on a per-occurrence basis, and is billed on a predefined billing period or cycle (e.g., weekly or monthly). In this scenario, the server may determine the amount owed for a given billing period by summing the ad-value contributions of the ad-space occurrences that are detected during the billing period. Other billing techniques may also be used to charge advertisers on a per-occurrence basis.

When an advertiser is billed for advertisement rights on a per-occurrence basis, the advertiser may be charged a fixed amount for each occurrence, or may be charged an amount that can vary from occurrence to occurrence.

More specifically, in some cases, it may be assumed that all views of an advertisement are of equal value (or that views of differing values may revert to a fixed average or median value over time). In this and other cases, the same amount may be charged per occurrence.

However, an exemplary method may also account for the fact that some views of an advertisement may be more valuable to an advertiser than other views. For example, the amount due according of a given occurrence may vary depending on factors such as the duration of occurrence, how focused the viewer was on the advertisement space (e.g., as indicated by a focus value), and/or characteristics of the particular user who viewed the ad, among others. Accordingly, an exemplary method may involve determining ad-value contributions for individual occurrences of an advertisement space, and determining an amount to be paid in a billing cycle based on the individual ad-value contributions during the billing cycle. Methods for determining ad-value contributions of individual occurrences of an advertisement space are described in greater detail with reference to FIGS. 9B and 10.

C. Auctions

Figure 4:
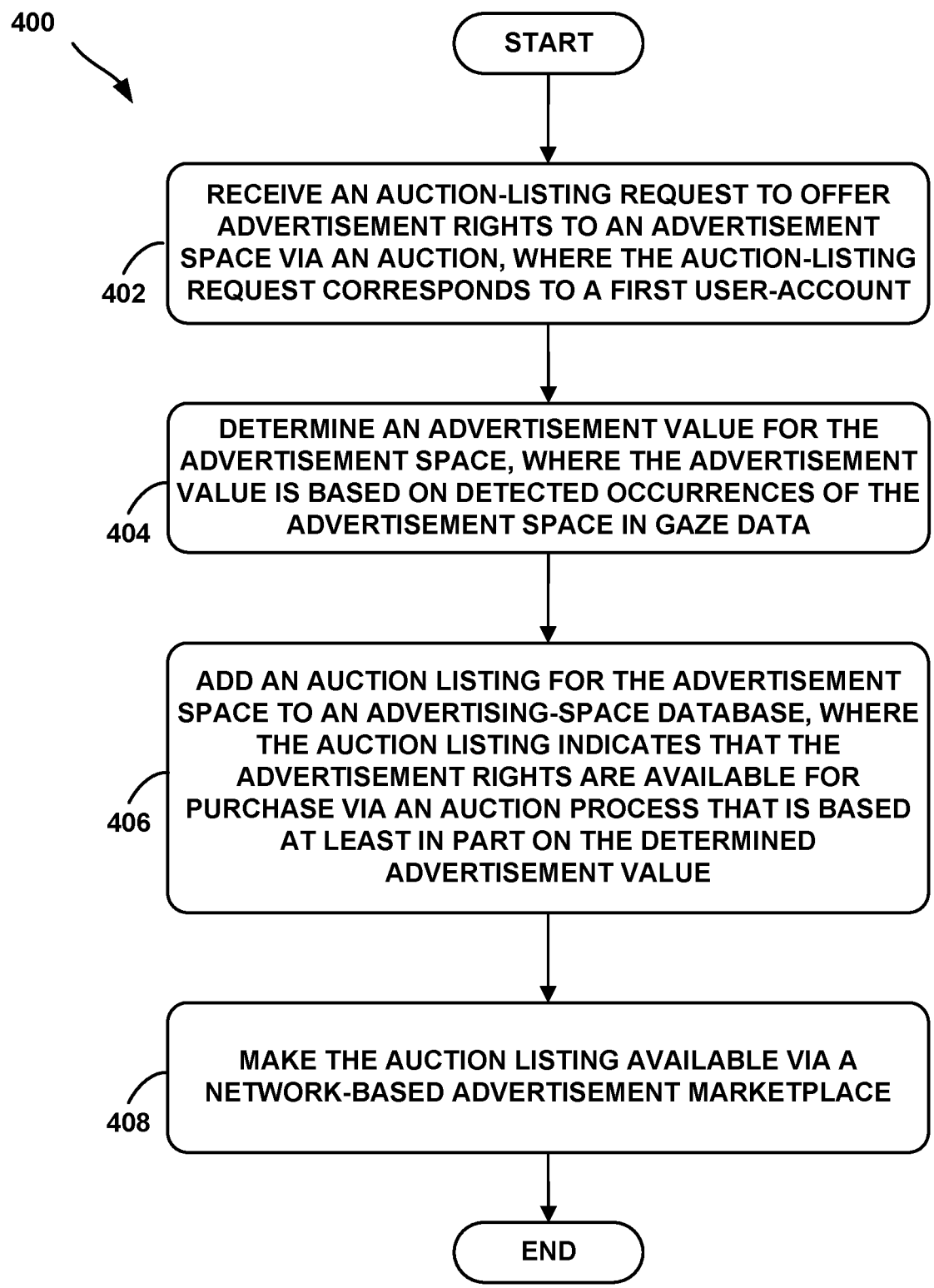
FIG. 4 is a flow chart illustrating an auction process for advertisement rights, according to an exemplary embodiment.

As noted, pricing for an advertisement space may also be set using an auction process. For example, FIG. 4 is a flow chart illustrating an auction process for advertisement rights, according to an exemplary embodiment.

More specifically, method 400 may involve the server system receiving an auction-listing request to offer advertisement rights to an advertisement space via an auction, where the auction-listing request corresponds to a first user-account, as shown by block 402. The server may also determine an advertisement value for the advertisement space, where the advertisement value is based on detected occurrences of the advertisement space in gaze data, as shown by block 404. Further, in response to the auction-listing request, the server system may add an auction listing for the advertisement space to an advertising-space database, where the auction listing indicates that the advertisement rights are available for purchase via an auction process that is based at least in part on the determined advertisement value, as shown by block 406. The server may then make the auction listing available via a network-based advertisement marketplace, as shown by block 408.

The auction process may be based on the determined advertisement value in various ways. For example, a minimum bid may be set to a certain percentage of the advertisement value. For instance, the auction process may require the first bid to be at least 60% of the advertisement value. Similarly, a reserve price for the auction may also be set to a percentage of the advertisement value. For instance, in the above example where the minimum bid is 60% of the advertisement value, the reserve may be set at 80% percent of the advertisement value. Therefore, while bidding may start at 60% of the advertisement value, the seller is not obligated to sell until bidding reaches at least 80% of the advertisement value. Many other examples are also possible.

VI. Valuation Requests

Figure 5:
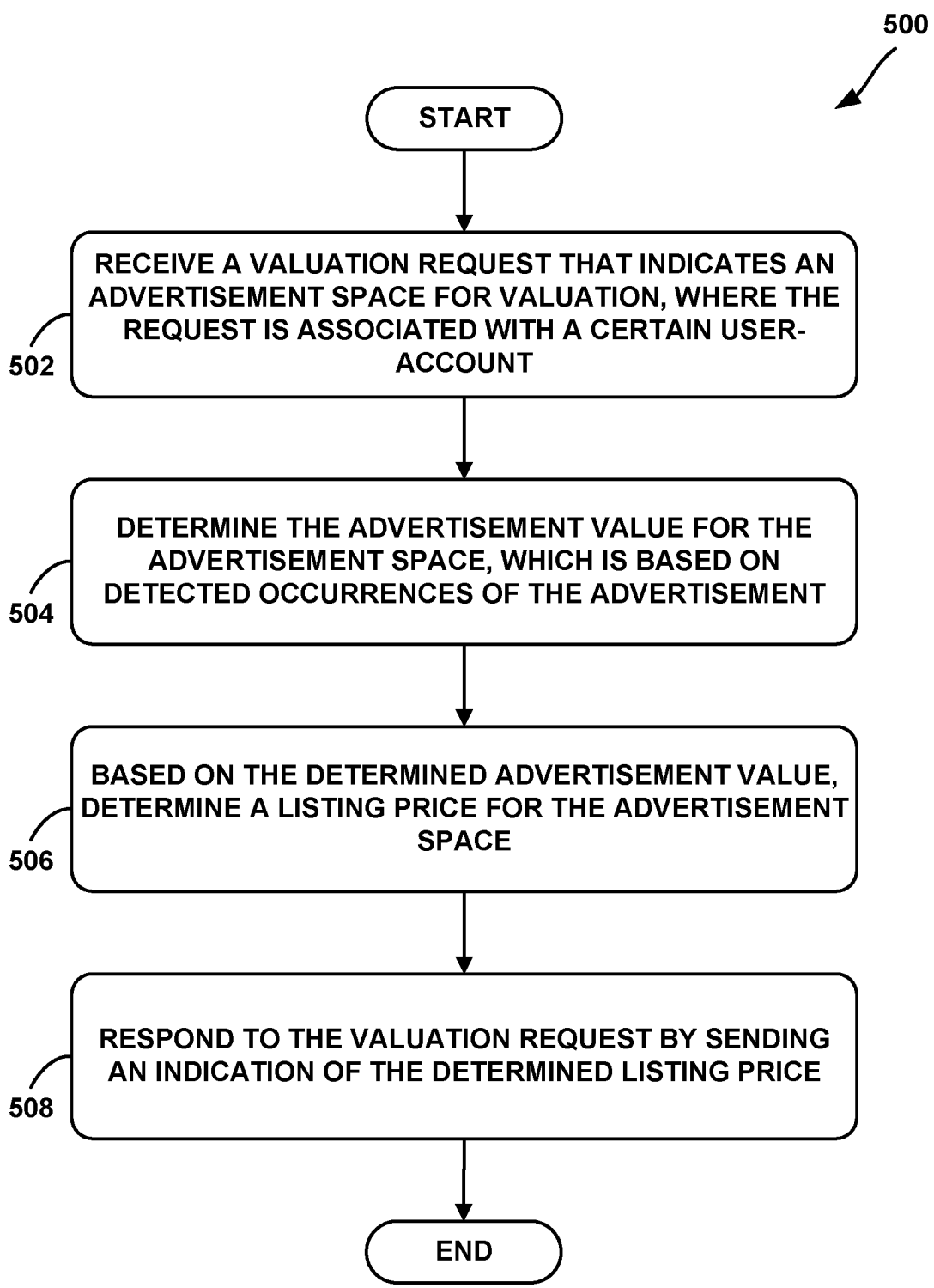
FIG. 5 is a flow chart illustrating a method for providing an advertisement space valuation in an advertisement marketplace, according to an exemplary embodiment.

As noted an exemplary advertisement marketplace may support valuation-request functionality, via which a user can request the advertisement value and/or the potential listing price for an advertisement space. For example, FIG. 5 is a flow chart illustrating a method for providing an advertisement space valuation in an advertisement marketplace, according to an exemplary embodiment.

More specifically, method 500 involves the server system receiving a valuation request that indicates an advertisement space for valuation, where the request is associated with a certain user-account (e.g., received from a computing device that is associated with the user-account), as shown by block 502. The system then determines the advertisement value for the advertisement space, which is based on detected occurrences of the advertisement space in gaze data, as shown by block 504. Then, based at least in part on the determined advertisement value, the system may determine a listing price for the advertisement space, as shown by block 506. The system can then respond to the valuation request by sending an indication of the determined listing price, as shown by block 508.

The valuation request may indicate the advertisement space by way of data that may itself be used to search the gaze data for the advertisement space and/or by way of data from which search criteria may be derived. The server may accordingly use the data that identifies the advertisement space to search for occurrences of the advertisement space in subsequently-received gaze data and/or in past gaze data that has been stored. In particular, the server may use a method such as that described in FIGS. 9A, 9B, and 10 to determine the advertisement value based on such gaze data. The server may then send an indication of the advertisement value to the user that requested the valuation. Additionally or alternatively, the server may send an indication of a potential listing price if the user were to list the advertisement space In some cases, when a valuation request is received at block 502, the system may already have the data needed to determine the advertisement value, or in some instances, may even have the advertisement value available. In particular, the system may have already have generated wearer-view data based on previously-detected occurrences of the identified advertisement space in gaze data, and further, may have determined an advertisement value based on this wearer-view data. This may occur in a number of scenarios. For example, a user may have made a general request to search gaze data for advertisement spaces that can be listed via their user account, provided general authorization to search for such advertisement spaces, or previously requested that the system create wearer-view data specifically for the identified advertisement space. Other examples are also possible.

Therefore, in order to determine the advertisement value for the indicated advertisement space at block 504, the system may first query the advertisement-space database to determine if an entry for the advertisement space exists and if so, whether the entry indicates existing wearer-view data and/or an advertisement value. If an advertisement value is indicated, the system may simply retrieve the advertisement value. If wearer-view data exists, but no advertisement value is indicated or the advertisement value is determined to be out-of-date (e.g., not based on the latest available wearer-view data), then the system may use the existing wearer-view data to determine the advertisement value.

On the other hand, if no ad-value is available and no wearer-view data exists (or if existing wearer-view data is determined to be out-of-date), then the system may need to search gaze data for the advertisement space in order to generate the wearer-view data upon which the advertisement value can be based. To do so, the server may search stored gaze data for occurrences of the advertisement space and/or may search future gaze data for occurrences of the advertisement space. More specifically, in an exemplary embodiment, the server may carry out a method such as those described in FIGS. 9A, 9B, and 10 in order to determine to the advertisement value for the indicated advertisement space.

In a further aspect, note that if a listing request is received for advertisement space that is not yet include in the ad-space database, such as in method 100 of FIG. 1, then the system may automatically treat this listing as a valuation request and/or prompt the user as to whether they would like valuation to be performed. Once the advertisement value has been determined, the system may then allow the user to proceed with listing the advertisement space.

VII. Identifying Potential Advertisement Spaces

A. Automated Suggestion of Potential Advertisement Spaces

In some embodiments, an exemplary system may be configured to search gaze data for physical spaces that are not valued and/or that are not listed for sale in the advertisement marketplace. When such potential advertisement spaces are detected, an exemplary system may identify a user that is authorized to list the physical space for sale as an advertisement space, and/or may determine a potential listing price for the advertisement space. Further, the system may then notify the authorized user that the physical space can be listed as advertisement space in the advertisement marketplace.

Figure 6:
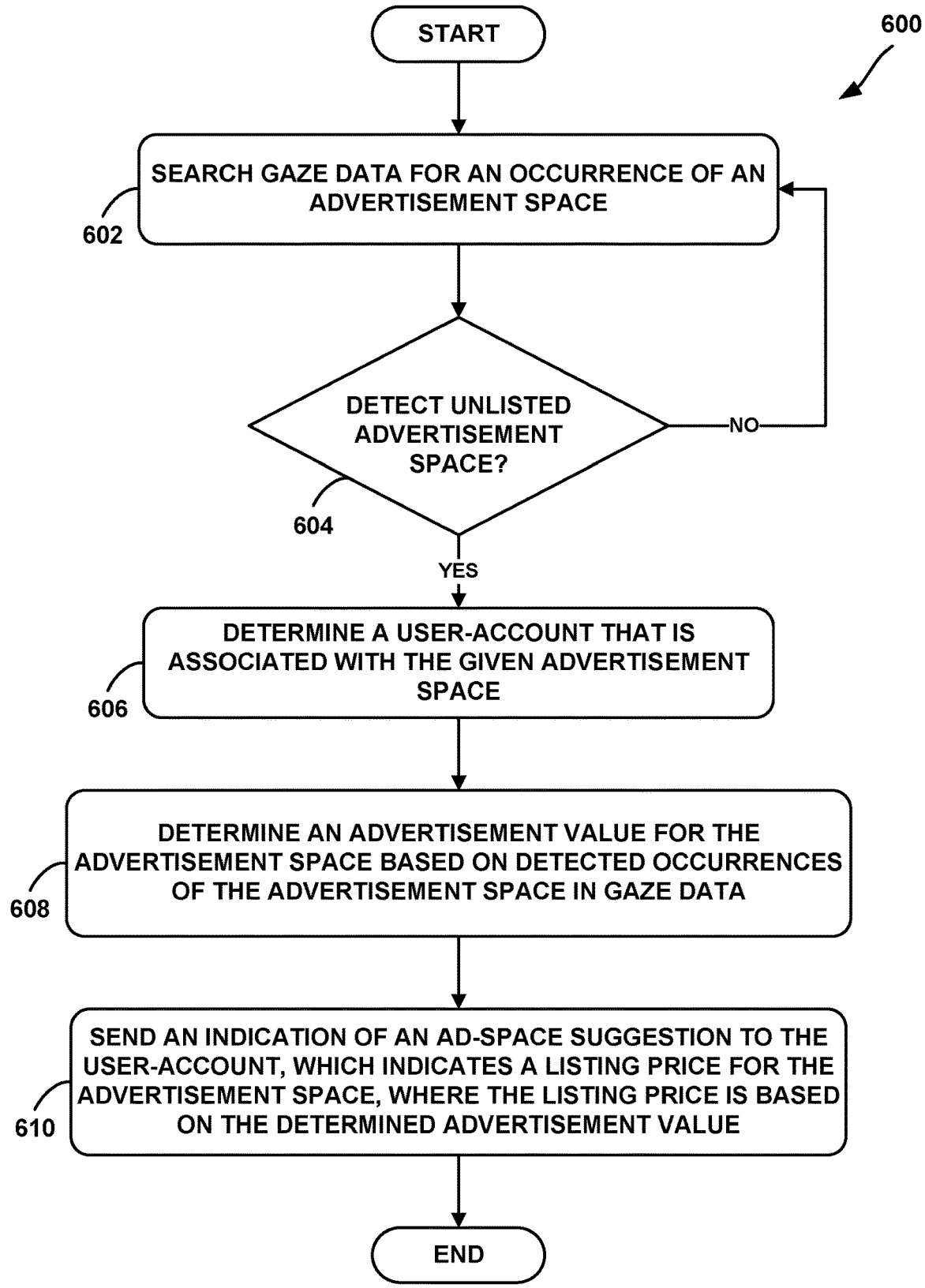
FIG. 6 is flow chart illustrating a method for locating potential advertisement spaces, according to an exemplary embodiment.

For example, FIG. 6 is flow chart illustrating a method for locating potential advertisement spaces, according to an exemplary embodiment. In particular, method 600 involves the server system searching gaze data for any occurrence of an advertisement space, as shown by block 602. Upon detecting one or more occurrences of a given advertisement space in the gaze data, the server may determine whether or not the given advertisement space is an unlisted advertisement space, as shown by block 604. If it is determined that the advertisement space is unlisted, then the system may determine a user-account that is associated with the given advertisement space, as shown by block 606. In addition, the system may determine an advertisement value for the advertisement space that is based on the detected occurrences of the advertisement space, as shown by block 608. The system may then send an indication of an ad-space suggestion message to the user-account, which indicates a listing price for at least the advertisement space that is based on the determined advertisement value, as shown by block 610.

B. Request for Identification of Advertisement Spaces that can be Listed

In an exemplary advertisement marketplace, method 600 may be implemented to automatically identify potential advertisement spaces that are currently unlisted, and notify users that are authorized to list these potential advertisement spaces of this possibility. This feature may be automatic, and thus may be performed without targeting potential advertisement spaces for any particular user. However, in some embodiments, features may be provided to allow a user to specifically request a search for unlisted advertisement spaces that can by listed by the user. This feature may help a user to provide advertisement spaces that they may have otherwise been unaware of, and may be helpful in other scenarios as well.

Figure 7:
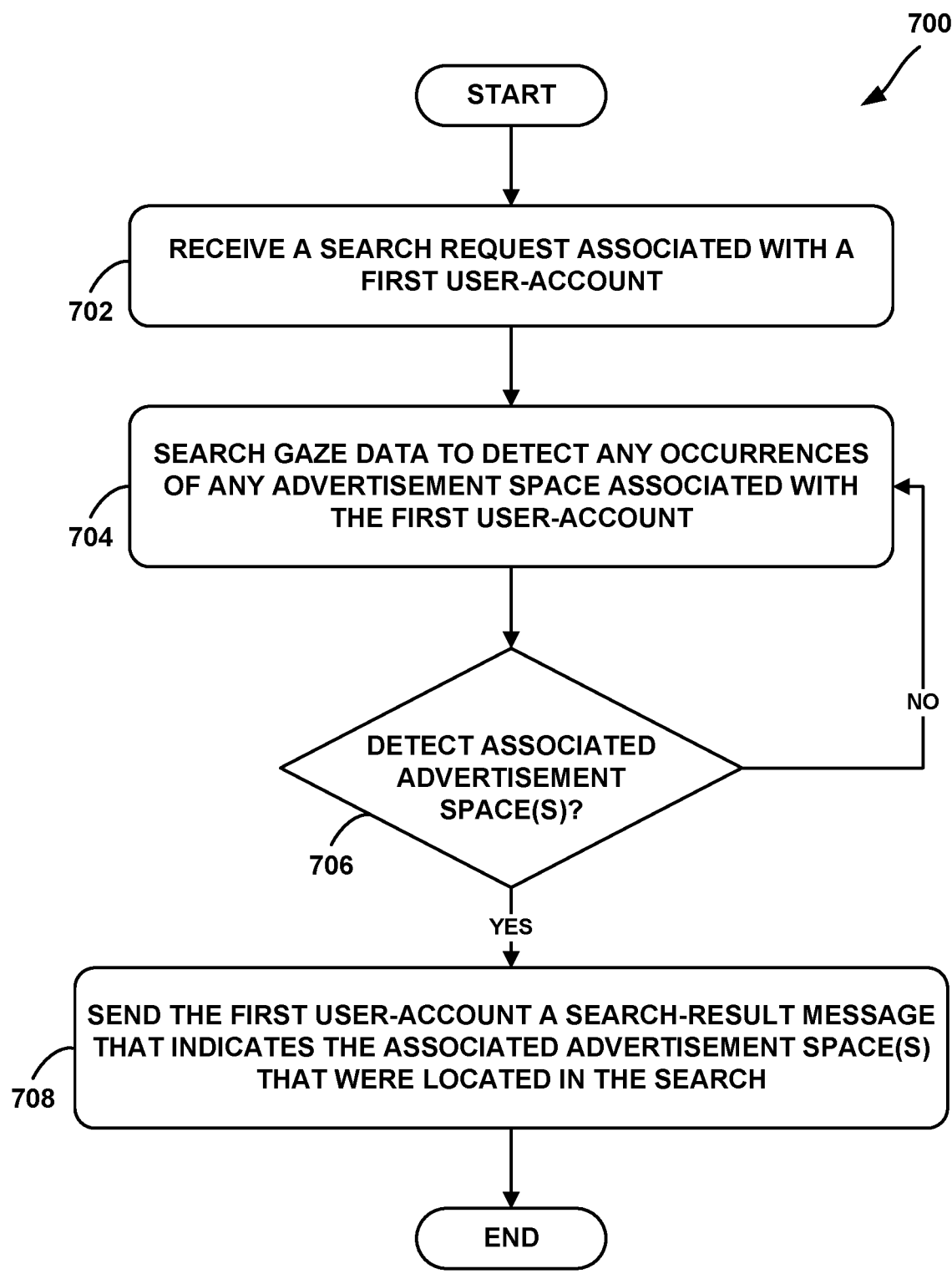
FIG. 7 is flow chart illustrating a method for providing a search-request feature, according to an exemplary embodiment.

For example, FIG. 7 is flow chart illustrating a method for providing a search-request feature, according to an exemplary embodiment. More specifically, method 700 involves the server system receiving a search request associated with a first user-account, as shown in block 702. In response to the search request, the server system searches gaze data to detect any occurrences of any advertisement space associated with the first user-account, as shown by block 704. In response to detecting one or more associated advertisement spaces in the gaze data, the server may send the first user-account a search-result message that indicates the associated advertisement spaces that were located in the search, as shown by block 706.

At block 706, the server may wait for a certain time period and/or wait until a certain number of associated advertisement spaces are detected, before sending the search-result message. Accordingly, the search-result message may indicate a number of potential advertisement spaces for the user-account. Alternatively, the server may send a separate search-result message upon detection of each associated advertisement space.

In a further aspect of an exemplary embodiment, the search and/or the search results may be limited to unlisted advertisement spaces. Accordingly, if unlisted advertisement spaces are detected at block 704, the server may provide the requesting user-account with an indication of the unlisted advertisement spaces at block 706.

In another aspect, the search-result message may also include a listing price for some or all of the associated advertisement spaces. As such, method 700 may further involve the system determining an advertisement value for at least one associated advertisement space, using gaze-data-based methods such as those described herein. The listing price may then be determined based on the advertisement value, and included in the search-result message. Provided with the listing price for an associated advertisement space, the user may send a listing request for the advertisement space. When the server receives such a listing request, the server may create a listing using an exemplary method, such as method 100.

C. Advertisement-Interest Indication Functionality

In another aspect, an exemplary advertisement marketplace may include features that allow a user (i.e., an "advertiser") that is interested in an unlisted advertisement space to indicate their interest. For example, the advertisement marketplace may build a database of unlisted advertisement space using techniques similar to those described in blocks 602 to 606 of Figure, or using other techniques. The advertisement marketplace may then provide an interface via which advertisers can browse and/or search the unlisted advertisement spaces. This interface may allow an advertiser to indicate their interest in purchasing an unlisted advertisement space and/or to request that the user who is authorized to list the advertisement space be notified of this interest, in hopes that the user will then chose to list the advertisement space in the advertisement marketplace.

In other cases, an exemplary advertisement marketplace may allow an advertiser to indicate a interest in purchasing advertisement rights to a physical space that the system has not yet identified as an advertisement space. When the system receives such a request, the system may first need to determine which user is authorized to list the advertisement space (if any), so that an indication of the advertiser's interest can be sent to the user.

Figure 8:
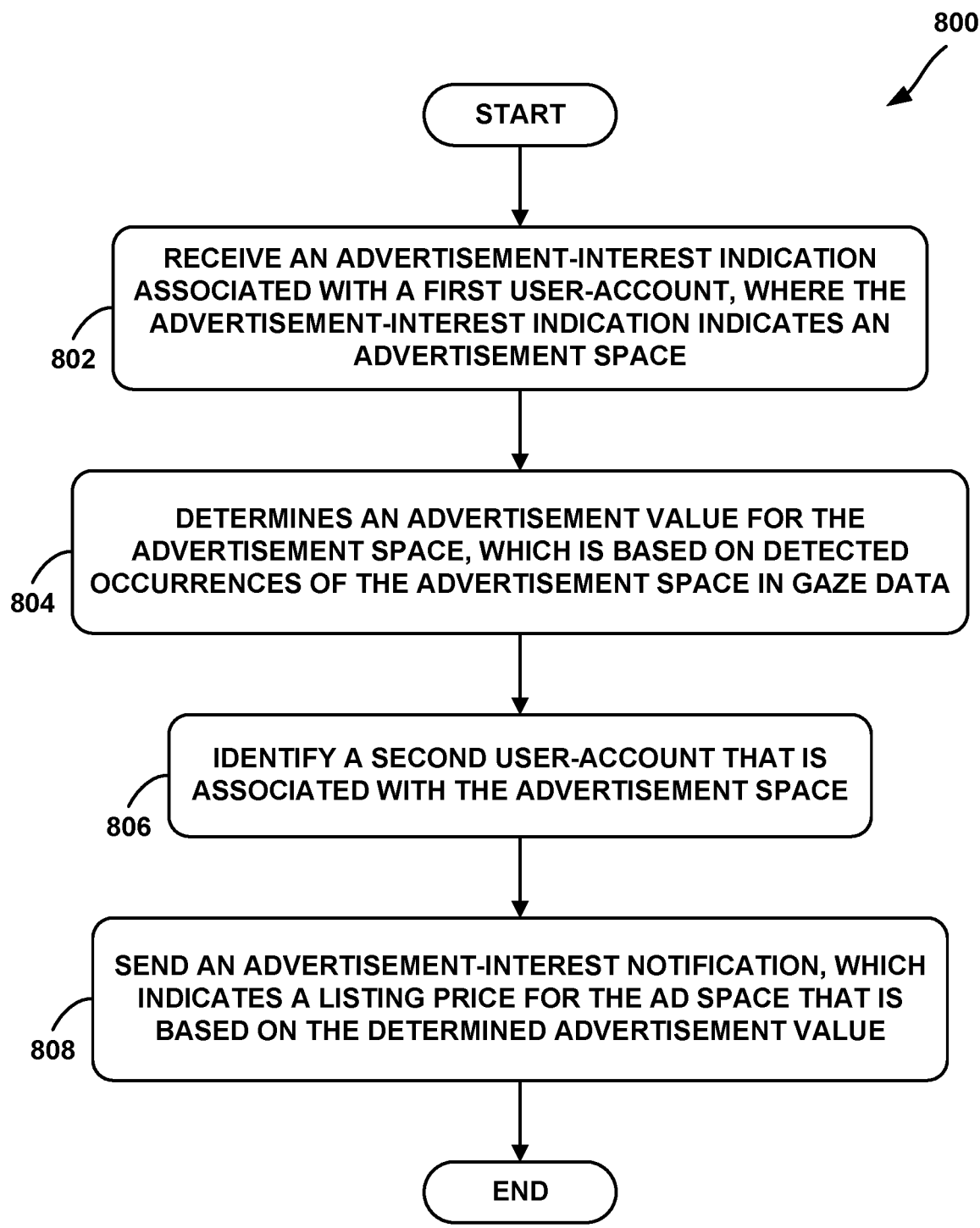
FIG. 8 is flow chart illustrating a method that provides advertiser-request functionality, according to an exemplary embodiment.

FIG. 8 is flow chart illustrating a method that provides advertiser-request functionality, according to an exemplary embodiment. In particular, method 800 involves the server system receiving an advertisement-interest indication associated with a first user-account, where the advertisement-interest indication indicates an advertisement space, as shown by block 802. The system then determines an advertisement value for the advertisement space, which is based on detected occurrences of the advertisement space in gaze data, as shown by block 804. The system then identifies a second user-account that is associated with the advertisement space, as shown by block 806. The system then sends an advertisement-interest notification, which indicates a listing price for the advertisement space that is based on the determined advertisement value, to the second user-account, as shown by block 808.

In an exemplary embodiment, the associated user-account identified at block 806 is a user-account of the user or one of multiple users that are authorized to list the advertisement space (e.g., the owner of the advertisement space or a representative of the owner). Further, in some implementations, multiple user-accounts may be identified at block 806 (e.g., both the user-account of the owner and a user-accounts for a representative of the owner).

VIII. Detecting Advertisement Spaces in Gaze Data

As noted above, various embodiments involve analysis of gaze data to detect and/or identify when advertisement spaces occur in gaze data. Referring back to FIG. 2, in order to detect ad-space occurrences, an exemplary server system 200 may employ various types of video and/or image-processing techniques. For instance, advertisement server system 204 may implement various well known and yet-to-be-developed techniques for object recognition in video and/or still images in the process of recognizing advertising spaces.

In some cases, an advertisement space may be identified in gaze data by way of the advertisement that is displayed in the advertisement space. For example, ad-space database 210 may include data related to which specific advertisements are being displayed in which advertisement spaces (and may further indicate when there is no advertisement being displayed in a given advertisement space). As such, ad-valuation server 212 may search for advertisements that are currently being displayed in gaze data. To do so, the ad-valuation server may user various visual search techniques that are now known or yet to be developed in order to identify an advertisement in gaze data.

In other cases, an advertisement space may itself be identified, without necessarily relying on the particular advertisement that is being displayed in the advertisement space. (Note that this functionality may be particularly useful in cases where an advertisement space is empty.) In such an embodiment, detecting that an advertisement space occurs in gaze data may involve recognizing when the gaze data includes an object or a certain combination of objects that are associated with a particular advertisement space. For example, to recognize advertisement space on the bumper of a particular car, gaze data may be analyzed for an object shaped and/or having coloration that is characteristic of a car bumper. Further, the gaze data may be analyzed for an object having such a shape and/or coloration in conjunction with a license plate having a certain license plate number. In such an embodiment, the server system may consider an occurrence of a bumper in combination with the license plate number for the specific car to be an occurrence of the advertisement space on the car's bumper. Many other examples are also possible.

In some cases, searching gaze data from a large number of wearable computing devices for a large number advertisement spaces may be data intensive. Accordingly, an exemplary server and or wearable computing devices may implement pre-processing techniques to tag and ID certain types of objects or certain types of information in gaze data, which may help to speed up the process of detecting advertisement spaces. In some instances, wearable computing devices and/or the server may also store gaze data for processing when, e.g., a wearable computing device is offline, or when the amount of real-time data being collected is generally less. For example, a server may use certain processing resources to receive incoming gaze data during the day, when more gaze data may be received, and then re-assign these processing resources to analyze stored gaze data for advertisement spaces at night, when less new gaze data may be received.

In some embodiments, a server system may utilize location data to detect an occurrence of an advertisement space in gaze data. For example, a server system may determine or be provided with the geographic location of a particular advertisement space (e.g., the GPS coordinates of the advertisement space). Then, when the advertisement space is detected in gaze data from a particular wearable computing device, the server may determine the location of the wearable computing device. If this wearable computing device is located such that the advertisement space could be visible to the wearer of the wearable computing device (e.g., within a predetermined distance from the location of the advertisement space), then the server system may consider this an occurrence of the advertisement space. However, if the wearable computing device that provided the gaze data is located such that the advertisement space could not be viewed by the wearer (e.g., not within a predetermined distance from the location of the advertisement space), then the server system may not consider this an occurrence of the advertisement space.

As another example, a server system may use the geographic location of a particular advertisement space to limit the gaze data that is monitored for the advertisement space. For instance, the server may determine the locations of wearable computing devices from which gaze data is received. As such, the server may only monitor gaze data that is received from wearable computing devices that are located within a predetermined distance from the advertisement space. Other methods that utilize the location of an advertisement space when detecting occurrences of the advertisement space in gaze data are also possible.

In some embodiments, radio frequency identification (RFID) may be used to help detect occurrences of an advertisement space in gaze data. In particular, an advertisement space may be associated with a certain RFID tag, and wearable computing devices may be configured with RFID readers. As such, when a wearable computing device detects an RFID tag from an advertisement space, the wearable computing device may relay this to the server system. For instance, when the wearable computing device detects an RFID that is associated with an advertisement space, it may insert metadata into the gaze data which indicates the RFID tag and the time at which the RFID tag was detected. Alternatively, the wearable computing device may send a separate message indicating that the RFID tag was detected at a particular time. In either case, the server system can then search for the associated advertisement space in gaze data that is received from the wearable computing device at or near the time when the RFID tag is detected. This may help the server system to more efficiently detect occurrences of advertisement spaces, as the timing with which the RFID tags are detected may indicate, for example, times in corresponding point-of-view video where the advertisement space is likely to occur. Further, various types of RFID may be utilized, such as near-field communications (NFC) and/or other types of RFID, depending upon the implementation.

In some embodiments, barcodes may be used to help detect occurrences of an advertisement space in gaze data. For instance, a barcode that identifies an advertisement space may be displayed within or near to an advertisement space. The server system may then search for barcodes within gaze data. When a barcode associated with a particular advertisement space is detected, the server may consider this to be an occurrence of the advertisement space, or may treat this as a factor that, along with other factors, can indicate that there is an occurrence of the advertisement space in the gaze data. Various types of barcodes, such as high capacity color barcodes (HCCBs) and/or quick response (QR) codes may be utilized in such an embodiment. Other types of barcodes are possible as well.

In a further aspect, machine-readable codes may also be associated with a particular ad that is displayed in an ad space. For example, a certain advertisement may be associated with a certain QR code. As such, the advertisement may be detected when the QR code is detected in gaze data.

Further, in some embodiments, machine-readable codes may be associated with a certain combination of a particular advertisement and a particular user-account. As such, each copy of the same advertisement may have a different QR code, which uniquely identifies the user-account that is authorized to sell the advertisement space. As a result, detecting a QR code in gaze data may enable an exemplary server system to positively identify not only the advertisement that is displayed in the advertisement space, but also which copy of the advertisement has been detected. This may be useful in a scenario where the advertisement space itself is difficult to detect, and in other scenarios as well.

It should be understood that the above techniques for detecting occurrences of advertisement spaces are not intended to be limiting. Other techniques are also possible.

IX. Determining the Value of an Advertisement Space

As noted, in some embodiments, an exemplary system may be configured to use gaze data to determine advertisement values for advertisement spaces. Further, an exemplary system may be configured to determine an advertisement value for many types of physical spaces; many of which may not have been valued using traditional advertisement valuation techniques.

FIG. 9A is a flow chart illustrating a method according to an exemplary embodiment. This method may be implemented by a computing device, and in particular, by a server system, in order to value an advertisement space based on point-of-view gaze data received from a number of wearable computing devices (which may be referred to interchangeably as wearable computing devices). Note that wearable computing devices may also be referred to as wearable computers herein. Further, a server system that implements an exemplary method may be referred to as an ad-valuation system, as an ad-valuation server, or simply as a server.

As shown by block 902, method 900 involves a server system receiving gaze data from a number of wearable computing devices. The server system analyzes the gaze data from the wearable computing devices to detect occurrences of an advertisement space in the gaze data, as shown by block 904. The server system then generates wearer-view data for the advertisement space, which is based on detected occurrences of the advertisement space in the gaze data, as shown by block 906. The wearer-view data can then be used as a basis for determining an advertisement value for the advertisement space, as shown by block 908. Once the advertisement value is determined, the server system may cause a computing system to make the advertisement space available for purchase at the determined advertisement value, as shown by block 910.

In an exemplary method 900, the gaze data is received from a number of wearable computing devices. Further, the gaze data from each wearable computing device is generally indicative of a respective wearer-view associated with the given wearable computing device. For example, the gaze data from each wearable computing device may take the form of point-of-view video that is captured at the wearable computing device. As such, the gaze data that is analyzed by the server system may include a number of point-of-view videos (e.g., a respective point-of-view video from each of the wearable computing devices).

The gaze data from some or all of the wearable computing devices that provide gaze data may additionally or alternatively take forms other than point-of-view video. For example, the gaze data from some or all of the wearable computing devices may take the form of respective point-of-view images captured by a forward- or outward-facing camera on the respective wearable computing device. As a specific example, a given wearable computing device may periodically take a picture, and then send the picture to the server system for use in generating wearer view data. To do so, the wearable computing device may analyze point-of-view video for one or more advertisement spaces, and generate a screen capture of the video when and advertisement space detected. The wearable computing device may then send the screen capture to the server system. Other examples are also possible.

Since the gaze data from a given wearable computing device is generally indicative of the wearer-view of the wearable computing device's wearer, the gaze data is generally indicative of what the wearer of the device is actually looking at. Further, since the wearer-view data is based on the gaze data, the wearer-view data is indicative of actual views of the advertisement space by wearers. For instance, the wearer-view data may provide an indication of how many people are looking at a particular advertisement space, which people are actually looking at a particular advertisement space, when people are looking at a particular advertisement space, and/or how long people are actually looking at a particular advertisement space, among other information. As such, the wearer-view data may help to more accurately determine what an advertising space is worth.

As noted above, when occurrences of an advertisement space are detected in gaze data, an exemplary method 900 may involve generating wearer-view data that is based on the detected occurrences. As such, an exemplary server system 204 may be configured to carry out an exemplary method 900 or portions thereof for many different advertisement spaces. Generally, the accuracy of the ad-space valuation will typically increase as the number of wearable computing devices providing gaze data increases. However, the gaze data may be collected from any number of wearable computing devices without departing from the scope of the invention.

To facilitate determining an advertisement value for a given advertisement space, the wearer-view data may provide various types of information. For example, the wearer-view data for a given advertisement space may include, for each detected occurrence of the given advertisement space: (a) data indicating the particular wearable computing device that provided the gaze data in which the advertisement space occurred, (b) data indicating a user-profile associated with the particular wearable computing device, (c) data indicating a time of the detected occurrence, (d) a duration of the detected occurrence, and/or (e) other information.

Generally, the function of generating wearer-view data for the advertisement space, as shown in block 906 of method 900, may vary depending upon the information to be included in the wearer-view data. In an exemplary embodiment, detecting an occurrence of an advertising space in the gaze data may serve as a trigger for the server system to generate wearer-view data recording the fact that the occurrence was detected. Further, to generate the wearer-view data for a given occurrence, the server system may extract information from the gaze data in which the occurrence was detected. The extracted information (or information derived from the extracted information) may be included in the wearer-view data generated for the detected occurrence.

A. Per-Occurrence Data for an Advertisement Space

In some embodiments, the server system 204 may update the wearer-view database 308 upon each detected occurrence of an advertisement space. For example, the server system may generate a record in the wearer-view database for each detected occurrence of an advertisement space. In such an embodiment, the record for a given occurrence of an advertisement space may include: (a) an indication of the particular wearable computing device that provided the gaze data in which the advertisement space occurred, (b) an indication of a user-profile associated with the particular wearable computing device, (c) a time of the occurrence, and/or (d) a duration of the occurrence.

The wearer-view data for a given occurrence of an advertisement space may indicate the corresponding wearable computing device that provided the gaze data in which the advertisement space occurred. In such an embodiment, the server system may determine the corresponding wearable computing device in various ways. For instance, consider an embodiment where the server system receives point-of-view (POV) video stream from a number of wearable computing devices. In such an embodiment, the server system may establish a communication session to receive the video stream from a given one of the wearable computing devices, and as part of establishing and/or participating in the session, may receive an identifier of the wearable computing device. (Note that various protocols, which are well known in the art, may be used to receive a POV video stream and/or to receive other forms of gaze data.) Additionally or alternatively, metadata in the gaze data itself may include an identifier of the wearable computing device that is providing the gaze data. Other techniques for determining which wearable computing device corresponds to a particular occurrence of an advertisement space are also possible.

As further noted above, the wearer-view data for a given occurrence of an advertisement space may indicate an associated user-profile, which is associated with the wearable computing device that provided the gaze data having the particular occurrence. The server system may determine the associated user-profile in various ways. For example, the server may determine the identifier for the corresponding wearable computing device in a manner such as described above or otherwise. The server may then look up a user-profile of a user that is registered to use or is otherwise associated with the corresponding wearable computing device (e.g., by querying a user database that indicates which users are associated with which wearable computing devices). Alternatively, a user-identifier may be provided in the course of receiving the gaze data (e.g., in a communication session or in metadata). In such an embodiment, the server system may use the user-identifier to access a user-profile for the user. As another alternative, the user-profile itself may be received directly from the device (e.g., during the communication session in which the gaze data is received, as metadata included in the gaze data, or in a separate message that is associated with the gaze data). Other techniques for determining a corresponding user-profile for a particular occurrence of an advertisement space are also possible.

In a further aspect, when the wearer-view data for a given occurrence indicates the associated user-profile, the wearer-view data may simply include an identifier of the associated user-profile. In such an embodiment, the data from such user-profiles may be stored in one or more separate user-profile databases. In this case, the server may use the identifiers of the associated user-profiles to retrieve the data from the actual user-profiles. Alternatively, some or all of the data from the associated user-profile may be included in the wearer-view data for the advertisement space (e.g., in wearer-view database 308).

In a further aspect, the server system may include a time stamp in the wearer-view data that is generated for a given occurrence. The timestamp may indicate the time at which the occurrence of the advertisement space was detected. Additionally or alternatively, the timestamp may indicate a time that is derived from time data included in the gaze data. For example, point-of-view video from a given wearable computing device may include time data indicating when the video was recorded by the wearable computing device. As such, the server system may use this time data to generate a timestamp for an occurrence that is detected in such point-of-view video. For instance, the server system may determine a frame or frames of the video that include the advertisement space, and use a time stamp or time stamps of the frame or frames to generate the timestamp for the detected occurrence. Other techniques for generating a timestamp for a particular occurrence of an advertisement space are also possible.

In another aspect, the wearer-view data for a given occurrence of an advertisement space may indicate the duration of the given occurrence. Accordingly, the server system may be configured to determine the duration of a given occurrence of an advertisement space. For instance, in the above example where POV video includes time data, the server system may use timestamps on frames of the video to determine the duration of time the first frame of the video that includes the advertisement space and the last subsequent and consecutive frame that includes the advertisement space. Alternatively, the server system may implement its own timer to determine the duration of a given occurrence of an advertisement space. Other techniques for determining the duration of a particular occurrence of an advertisement space are also possible.

In a further aspect, when generating wearer-view data for a given occurrence, the server may consider whether the wearable computing device that corresponds to a given occurrence was being worn during the occurrence. In particular, if the corresponding wearable computing device is not being worn at the time of the detected occurrence, the server may adjust or change the wearer-view data that is generated in response to detecting the occurrence. For example, when the wearable computing device is not being worn, the server may interpret this to mean that the gaze data from the wearable computing device is unlikely to represent what the wearer is actually viewing. Accordingly, the server may include an indication that the wearable computing device was not being worn in the wearer-view data that is created for such an occurrence. Further, server may adjust the wearer-view data so as to decrease the weight of such an occurrence when determining the advertisement value for the advertisement space, or may ignore the occurrence entirely (e.g., by refraining from generating any wearer-view data for the occurrence).

B. Summary Data for an Advertisement Space

In some embodiments, the wearer-view data for a given advertisement space may include summary data for the advertisement space such as: (a) a list of which wearable computing devices viewed the advertisement space (e.g., which wearable computing devices provided gaze data in which one or more occurrences were detected), (b) a list of the user-accounts or the user-profiles that are associated with the wearable computing devices that have viewed the advertisement space, (c) a total view count indicating the total number of detected occurrences of the advertisement space, (d) a total view duration of the advertisement space, (e) an average view duration for occurrences of the advertisement space, and/or (f) a view rate that indicates how frequently the advertisement space occurs in the gaze data (e.g., occurrences/hour, occurrences/month, etc.). The wearer-view data for a given advertisement space may additionally or alternatively include other types of summary data for the advertisement space.

In order to keep the above and other such summary data substantially current, the server system may update the wearer-view data for an advertisement space each time the advertisement space is detected in gaze data. For example, when the server system detects an advertisement space in gaze data from a given wearable computing device, the server system may update the wearer-view data by: (a) adding the given wearable computing device to a list of wearable computing devices that have viewed the advertisement space (if the wearable computing device is not on the list already), (b) adding the user-account or the user-profile that is associated with the given wearable computing device to a list of user-accounts or user-profiles that have viewed the advertisement space, (c) incrementing the total view count for the advertisement space, (d) determining the duration of the occurrence and adding the determined duration to a total view duration for the advertisement space, and/or (e) determining the duration of the occurrence and adding the determined duration and recalculating the average view duration to account for the determined duration. Other examples are possible as well.

In some embodiments, the wearer-view data for each advertisement space may include only summary data such as that described above, and thus may not include per-occurrence data for each detected occurrence of an advertisement space. However, it is also possible that the wearer-view data for a given advertisement space may include only per-occurrence data, or may include both per-occurrence data and summary data for the advertisement space.

C. Focus Data for an Occurrence

In some embodiments, the wearer-view data for a given advertisement space may include focus data, which is generally indicative of the amount of attention paid to an advertisement space by viewers of the advertisement space. The focus data may help to provide a more accurate valuation for the advertisement space by helping take into account the fact that not all views are necessarily equal, since the amount of attention paid to the advertisement space may vary between views. In such an embodiment, the server system may determine a focus value for a detected occurrence (as described above) when it generates wearer-view data for the occurrence, or may determine a focus value at a later time.

D. Use of Summary Data for Advertisement Valuation

As noted above, an exemplary method 900 may involve using the wearer-view data for an advertisement space to determine an advertisement value for the advertisement space. Various types of wearer-view data may be utilized when determining an advertisement value. For instance, various types of the summary data described above and/or various types of the per-occurrence data described above may be used to determine the advertisement value for a given advertisement space. An exemplary valuation method may also incorporate other types of data in addition to wearer-view data. Further, the manner in which a given type of wearer-view data is used to determine an advertisement value may vary depending upon the implementation.

In some embodiments, the advertisement value for a given advertisement space may be based on summary data for the advertisement space. For example, the advertisement value may be based at least in part on the total view count for an advertisement space (e.g., the total number of occurrences that are detected in the gaze data). In such an embodiment, the total number of occurrences may be tracked over all time. Alternatively, the total number of occurrences may be tracked over a predetermined period of time (e.g., a year, a month, a week, or a custom-defined time period). In an exemplary embodiment that incorporates total view count, the determined advertisement value will typically increase as the total number of occurrences increases. Further, the manner in which the total view count is used to determine advertisement value may vary, depending upon the implementation.

As another example, the advertisement value for a given advertisement space may be based at least in part on a view rate for the advertisement space (e.g., the rate at which occurrences of the advertisement space are detected in the gaze data). For instance, the wearer-view data may indicate a number of views per month, per week, per day, per hour, etc. In such an embodiment, the rate may be based on detected occurrences over all time. Alternatively, the rate may be based on occurrences during a predetermined period of time (e.g., during a year, a month, a week, or a custom-defined time period). In an exemplary embodiment that incorporates view rate, the determined advertisement value will typically increase as the view rate increases. Further, the manner in which the view rate is used to determine advertisement value may vary, depending upon the implementation.

In the above examples, the advertisement value is determined based on summary data that generally does not differentiate one detected occurrence from another. However, some embodiments may apply further intelligence to account for the fact that some views of an advertisement space may be more valuable to an advertiser than others.

For example, the advertisement value for a given advertisement space may be based at least in part on a total view duration and/or an average view duration for the advertisement space. In such an embodiment, the total view duration and/or the average view duration may be calculated from all detected occurrences of the advertisement space or from a representative sample of occurrences. In either case, the total view duration and/or the average view duration may be calculated over all time, or may be calculated over a predetermined period of time (e.g., a year, a month, a week, or a custom-defined time period). In an exemplary embodiment that incorporates total view duration and/or the average view duration, the determined advertisement value will typically increase as the total view duration and/or the average view duration increases. Accordingly, views that last longer will generally contribute more to the advertisement value and/or be weighted more heavily when determining the advertisement value. It should be understood that the manner in which the total view duration and/or the average view duration is used to determine advertisement value may vary, depending upon the implementation.

As another example, the server may determine focus values for all or a representative sample of the detected occurrences of an advertisement space. The server may then average the focus values for the detected occurrences to determine an average focus value for the advertisement space. The server can then use the average focus value to determine the advertisement value for the advertisement space.

In a further aspect, an exemplary embodiment may help account for the fact that views of an advertisement space by certain people may be considered more valuable than views of the same advertisement space by other people. More specifically, in an exemplary embodiment, wearers may opt-in to a program or otherwise give permission for information from their user-profile to be used to value advertisement spaces. Various types of information from an associated user-profile may then be used to determine how valuable a given occurrence of an advertisement space is. For instance, a user-profile for a wearer may include: (a) consumer information such as spending habits, locations of purchases, amounts of purchases, types or categories of purchases, timing of purchases, etc., (b) demographic information such as age or age group, ethnicity, nationality, sex, location of residence, and/or location of workplace, (c) contact and/or social networking information such as a wearer's contacts, and possibly data indicating a purchasing influence of the wearer with regard to their contacts (e.g., data indicating any correlation of the wearer's purchasing history to the wearers' friends' purchasing histories), and/or (d) other information such as income, job or job type, other job details, hobbies, interests, and so on.

Therefore, since the occurrence of an advertisement space in gaze data from a given wearable computing device may be interpreted to mean that the wearer of the given wearable computing device has viewed or is viewing the advertisement space, information from user-profiles that wearer-view data associates with a given advertisement space may provide information about the type or types of people that an advertisement space reaches and/or of the characteristics of people that the advertisement space reaches. As a result, this information may be used to more accurately determine what types of people are viewing the advertisement space, and value the advertisement space accordingly. In particular, an exemplary server may place greater weight on occurrence of an advertisement space associated with certain people and/or certain types of people when determining the advertisement value for a given advertisement space.

For example, the server may determine a respective income level for the user-profile associated with each occurrence. The server may then average the determined income levels to calculate an average income level for viewers of the advertisement space, and use the average income level as input data to determine the advertisement value for the advertisement space. Alternatively, the server may determine an income range of the determined income levels, and use the income range as an input to the ad-value calculation for the advertisement space. Other examples are also possible.

It should be understood that the advertisement value for a given advertisement space may be based upon one type of summary data or a combination of various types of summary data. For example, in one implementation, the total number of views, the view rate, the average view duration, and one or more characteristics of the associated user-profiles, could all be used as inputs when calculating advertisement value. Many other examples are also possible.

E. Use of Per-Occurrence Ad-Value Contributions for Advertisement Valuation

In some embodiments, a server system may determine an advertisement value for an advertisement space by first determining an individual advertisement-value contribution for each detected occurrence of the advertisement space. The advertisement-value contribution for a given occurrence may be based on information from the user-profile associated with the occurrence and/or on other information related to the occurrence. The collective knowledge provided by all the individual advertisement-value contributions may then be used to determine the advertisement value for the advertisement space and/or be used to determine summary data for the advertisement space, which may in turn be used to determine the advertisement value.

FIG. 9B is a flow chart illustrating a method for determining advertisement value, according to an exemplary embodiment. In particular, FIG. 9B illustrates a method 950 in which the advertisement value for an advertisement space is based on individual ad-value contributions of occurrences of the advertisement space in gaze data.

More specifically, method 950 involves monitoring gaze data from a number of wearable computing devices for occurrences of a particular advertisement space, as shown by block 952. Each time an occurrence of the advertisement space is detected, as shown by block 954, the server system may further determine an advertising-value contribution of the occurrence, as shown by block 956. The server system may then determine advertising-value contributions for a number of occurrences by repeating blocks 954 and 956 for a number of detected occurrences of the advertisement space. The server system may then use the advertising-value contributions for the detected occurrences of the advertisement space as a basis for determining the advertisement value for the advertisement space, as shown by block 958.

In some embodiments, such as method 950 of FIG. 9B, the ad-value contribution for each occurrence of an advertisement space may be determined upon detecting the occurrence in the gaze data. However, it should be understood that the ad-value contribution for some or all occurrences of an advertisement space may be calculated at a later time, based on wearer-view data that is stored as the occurrences are detected in the gaze data.

A server may use various techniques to determine the individual ad-value contribution for a given occurrence of an advertisement space in gaze data. Such techniques may utilize various different factors to determine the ad-value contribution for a given occurrence. In some embodiments, the server may use a weighting value for an occurrence to determine the ad-value contribution of the occurrence. In particular, the server may determine a weighting value that generally indicates the particular occurrence's value relative to a "standard" occurrence of the advertisement space. The weighting value for the particular occurrence may then be applied to a base advertising-value contribution to determine the advertising-value contribution for the particular occurrence. In such an embodiment, the weighting value may be based on various factors or combinations of factors, such as the particular wearable computing device from which the gaze data including the particular occurrence was received, the duration of the occurrence, characteristics of the person who viewed (e.g., as indicated by the user-profile associated with the occurrence), the focus value of the occurrence, and/or other factors.

As a specific example, the ad-value contribution for each occurrence of the advertisement space may be a dollar amount that is attributed to the occurrence. As such, the server may determine a dollar amount for the advertisement value by summing the ad-value contributions. As another example, the ad-value contribution for each occurrence of the advertisement space may be a price rate (e.g., dollars per month, dollars per view, etc.) that is attributed to a respective occurrence of the advertisement space. As such, the server may determine the advertisement value by summing the ad-value contributions to get an overall price rate. Other examples are also possible.

Once a server system has determined the individual ad-value contributions for a number of occurrences of the particular advertisement space, the server may use various techniques to determine the advertisement value for the advertisement space. For example, in some embodiments, the server may determine an average advertising-value contribution by averaging the advertising-value contributions of some or all of the detected occurrences. The server may then use the average advertising-value contribution as a basis for determining the advertisement value for the advertisement space. As a specific example, the server may determine an ad-value contribution for each occurrence in the same manner as the overall price or rate for the advertisement space, but using the assumption that all occurrences of the advertisement space are identical to the occurrence. The server may then determine a dollar amount or price rate for the advertisement space by averaging the ad-value contributions determined in this manner. Other examples are also possible.

It should be understood that techniques described herein for determining an advertisement value based on the ad-value contributions are not intended to be limiting. Other techniques for determining an advertisement value based on the ad-value contributions of individual occurrences are also possible, without departing from the scope of the invention.

F. Valuation of an Advertisement Space on a Per-Advertisement Basis

Some embodiments may involve determining a value an advertisement space that is specific to a particular type of advertisement. For example, an advertisement server may determine a value for an advertisement space when the advertisement space is used to display an advertisement for a particular type of product (e.g., for clothing or for a movie).

Further, in some embodiments, an exemplary method may be implemented for ad-specific valuation of an advertisement space based on the extent to which the advertisement space reaches the target market of the advertisement. For instance, wearer-view data may be used to determine who is viewing an advertisement space. The advertisement space valuation may then be based on the correlation between those who view the advertisement space and the target market of the specific advertisement.

In such an embodiment, an exemplary method may utilize wearer-view data indicating user-profiles associated with occurrences of an advertisement space in the gaze data. As such, the server may analyze the associated user-profiles to determine one or more characteristics of those who have viewed the advertisement space. More specifically, an exemplary method may involve determining a group of user-profiles associated with the advertisement space (e.g., user-profiles that are associated with wearable computing devices that captured the advertisement space in their respective gaze data). Then, based on characteristics of the associated user-profiles, the server may determine one or more viewer characteristics of the group. The viewer characteristics of the group may be interpreted as indicative of a "standard" viewer of the advertisement space. As such, the viewer characteristics of the group may incorporate when determining the advertisement value for a specific type advertisement.

For example, some embodiments may involve determining both: (a) the viewer characteristics of the group of associated user-profiles and (b) one or more target-viewer characteristics for the particular advertisement. The server may then compare the viewer characteristics of the group to the target-viewer characteristics and, based on the comparison, determine the advertisement value for the particular advertisement in the advertisement space.

In some embodiments, the advertisement value for the particular advertisement may be further based on the location of the advertisement space. In particular, there may be a relationship between the characteristics of a particular advertisement and the location of advertisement space, and an exemplary method may help to account for such a relationship. In such cases, a weighting factor may be applied to increase or decrease the advertisement value depending upon the relationship between the location of the advertisement space and the characteristics of the advertisement.

For example, consider an advertisement for a clothing product and an advertisement space that is located near to a shopping area and/or near to a store where the clothing product can be purchased. This advertisement space may generally be considered more valuable when used to display the advertisement for the clothing product than when used to display an advertisement for a type of product that cannot be purchased nearby. Accordingly, a weighting factor may be applied to increase the advertisement value for the clothing product in the advertisement space. Similarly, the weighting factor may function to decrease the advertisement value for a product that cannot be purchased nearby.

As another example, consider an advertisement for a movie and an advertisement space that is located near to a movie theater that is showing the movie. This advertisement space may generally be considered more valuable when used to display the advertisement for the movie than when used to display an advertisement for a movie that is not in any nearby theaters. Accordingly, a weighting factor may be applied to increase the advertisement value of the advertisement space for a movie that is showing in the nearby theater. Similarly, the weighting factor may decrease the advertisement value for the movie that is not in any nearby theaters. Other examples are also possible.

In a further aspect, some implementations of methods 900 and 950 may utilize the type of advertisement as the characteristic of the advertisement upon which the advertisement value is based. In such an embodiment, all advertisements of the same type may be evaluated in the same way. As such, the advertisement value in such an embodiment may in effect be determined for the type of advertisement in the advertisement space (rather than specifically for an individual advertisement). Alternatively, the type of advertisement may be one of a number of factors, such that an advertisement space may be valued differently for different advertisements that are classified as being the same type of advertisement.

In yet another aspect, the advertisement value may vary for a particular advertisement, if it is determined that the advertisement is more or less likely to interest wearers who view it. In particular, some embodiments may increase the advertisement value for an advertisement in a given advertisement space (and/or the amount that an advertiser is ultimately charged, if this differs from the advertisement value), when the advertisement that is more likely to interest the people who typically view the particular advertisement space. However, in other embodiments, the opposite approach is also possible. In particular, an exemplary system may actually decrease the advertisement value for an advertisement in a given advertisement space (and/or the amount that an advertiser is ultimately charged, if this differs from the advertisement value) when the advertisement that is more likely to interest the people who typically view the particular advertisement space.

While this may seem counter-intuitive in one sense, this strategy of charging less for more valuable advertisement selection may provide long-term gains. In particular, by displaying advertisements that are likely to interest users, the advertising format as a whole gains credibility with the viewing public, which may result in more people viewing the advertisement space in the long-term. Put another way, if people are disinterested in what they see in an advertisement space, they may choose not to view and/or ignore what is displayed in the advertisement space in the future. Therefore, by reducing the amount charged for advertising that interests users, advertisers are incentivized to provide advertising that is interesting. Providing such incentivizes may in turn increase the chances for long-term success in the advertising space and similar types of advertising spaces, thus creating more long term value for the seller and/or a third-party that is brokering advertisement sales.

FIG. 10 is a flow chart illustrating a method for using multiple factors to determine the ad-value contribution of a given ad-space occurrence in gaze data, according to an exemplary embodiment. In method 1000 of FIG. 10, a pre-determined base contribution for an occurrence of the advertisement space is weighted according to multiple factors in order to determine an ad-value contribution for each occurrence of an advertisement space in gaze data for a given user-account. The advertisement value for a given advertisement space may then be determined from the collective knowledge provided by the ad-value contributions of the all or a representative subset of its occurrences in gaze data. While method 1000 is described by way of example as being implemented by a server system, this by another device or system, or by a combination of the server system and/or other devices and systems.

Method 1000 involves the server system determining a weighting value (weighting_value$_i$) to be applied for an occurrence of an advertisement space ($O_i$) in gaze data. The weighting_value is based on m different factors (f_1$_i$ to f_m$_i$). In particular, the server system may determine a value for a first factor (f_1$_i$) with respect to a given occurrence of an advertisement space in, as shown by block 1002. The server system may then determine a benchmark value for the first factor (bm_f_1$_i$), as shown by block 1004. This benchmark may be the average or a mean value for the given factor over a sample set of different occurrences, or may be a predefined standard value for the given factor. The benchmark value may be determined in other ways as well.

In any case, the server system may determine a relationship between the determined value of the first factor for the given occurrence and the benchmark value with respect to the first factor (e.g., f_1$_i$/bm_f_1$_i$), as shown by block 1006. If there are additional factors to consider (e.g., if m is greater than one), as indicated by block 1008, then the server may repeat blocks 1002 to 1006 for the additional factors, until the relationship between the given user-account and relationship between the value for the given occurrence and the average value has been determined for each factor. Once all the factors have been evaluated, the server system may use the determined relationships as a basis for determining a weighting value for the occurrence, as shown by block 1010.

Thus, for a given occurrence $O_i$, and values for a set of n factors f_1 to f_n, method 1000 may be implemented to determine a weighting_value$_i$ as a function of the respective relationships between the values of factors for the respective occurrence f_1$_i$ to f_m$_i$ and the respective benchmark value bm_f_1$_i$ to bm_f_m$_i$. For example, weighting_value$_i$ may be calculated as:

$$\text{weighting\_value}_i = F[(f\_1_i/bm\_f\_1_i),(f\_2_i/bm\_f\_2_i), \ldots (f\_m_i/bm\_f\_m_i)]$$

Note that the particular function of the relationships used may vary from implementation to implementation, depending upon the design goals.

Once the server has determined the weighting_value$_i$ for a given occurrence $O_i$ of an advertisement space, the server may use a base contribution for an occurrence of the advertisement space detected in occurrence $O_i$ to calculate the ad-value contribution for the occurrence as:

$$\text{ad\_value\_contribution}_i = \text{base\_contribution}_i * \text{weighting\_value}_i$$

Further, the server system may repeat the above process to determine an ad-value contribution for each of n occurrences of the advertisement space in the gaze data. As such, the advertisement value for the advertisement space may be determined as a function of ad_value_contribution$_i$ for i equal 1 to n. For example, the advertisement value for the advertisement space may be calculated by summing ad_value_contribution$_i$ to ad_value_contribution$_n$. Other examples are also possible.

It should be understood that many other types of information provided by and/or related to a given user-account may be considered, alone or in combination, when determining the ad-value contribution of an advertisement space in gaze data for the given user-account. Further, information provided by and/or related to a given user-account may be considered in combination with other factors, such as duration of an occurrence and/or a focus value associated with the occurrence, when determining the ad-value contribution for an occurrence.

G. Adjusting the Advertisement Value Based on Other Factors

In some embodiments, advertisement valuation may be based on other types of data, in addition to wearer-view data. In such an embodiment, the advertisement server may determine a base value for the advertisement, or a weighting to be applied to the advertisement value based on an intrinsic value of the advertisement space, which accounts for the characteristics of the advertisement space itself, and then adjust the intrinsic value according to the wearer-view data.

For example, in some embodiments, an exemplary method may use the geographic location of the advertisement space as a further basis for determining the advertisement value for the advertisement space. For example, an advertisement that is located in a shopping area may have a greater intrinsic value than one that is located in an alley. Accordingly, an advertisement value that is determined based on wearer-view data may be adjusted based on the location of the advertisement space. Other examples are also possible. Generally, the type and/or the amount of adjustment that is applied due to the location of an advertisement space may vary depending upon the particular implementation.

Further, in some embodiments, the server may consider the type of advertisement space and/or the format in which advertisements can be displayed in the advertisement space when determining the advertisement value for the advertisement space. For example, an LCD billboard might generally be considered more valuable than an equivalent print billboard. As such, when an advertisement value is determined for a billboard based on wearer-view data, the determined advertisement value may be adjusted based on whether the billboard is an LCD or a print billboard. Other examples are also possible. Generally, the type and/or the amount of adjustment that is applied based on the type of advertisement space may vary depending upon the particular implementation. Further, other adjustments, based on other characteristics of an advertisement space, are also possible.

In another aspect, an advertisement space may be blank (e.g., not displaying an advertisement) during some or all of the period in which gaze data is being collected for purposes of determining the advertisement value. The fact that an advertisement space is blank, as opposed to displaying an advertisement, may affect the gaze data for the advertisement space because a blank space might attract less attention from nearby people. Further, different advertisements may attract different amounts of attention. Therefore, when an advertisement is displayed while gaze data is being collected, the particular advertisement may itself affect the gaze data. As such, it is possible that wearer-view data for an advertisement space may be effected by whether or not an advertisement space is blank, and if something is displayed in the advertisement space, what specifically is displayed.

Accordingly, an exemplary method may further involve determining a pre-sale weighting factor for an advertisement space, which is based on: (a) whether the advertisement space is blank while gaze data is being collected and/or (b) the characteristics of what is displayed in the advertisement space while gaze data is being collected. A server may then use the pre-sale weighting factor for the advertisement space as a further basis for determining the advertisement value for the advertisement space.

As a specific example, an exemplary method may further the server determining whether or not the advertisement space had an advertisement in place while receiving and analyzing the gaze data. Then, if the advertisement space had an advertisement in place, the server may apply a first adjustment to the wearer-view data before using the wearer-view data to determine the advertisement value (e.g., an adjustment or weighting factor that corresponds to the particular advertisement that is displayed). On the other hand, if an advertisement was not displayed in the advertisement space, then the server may apply a second adjustment to the wearer-view data (e.g., an adjustment that accounts for the fact that no advertisement was displayed).

In such an embodiment, the server may determine whether or not the advertisement space had an advertisement in place in various ways. For example, the server may query an advertisement space database to determine whether the advertisement space is in use and if so, what advertisement is being displayed. Additionally or alternatively, the server may analyze the gaze data itself (e.g., by analyzing point-of-view video in which the advertisement space is detected). Other examples are also possible.

In yet another aspect, some embodiments may implement gaze-data requirements that require a certain amount of gaze data be analyzed before an advertisement space can be offered for sale in an ad-marketplace system. For instance, an ad-marketplace system may require that gaze data from a threshold number of devices have been analyzed before the determined advertisement value is deemed accurate enough to offer the advertisement space for sale via the marketplace. Additionally or alternatively, ad-marketplace system may require that gaze data be monitored for a certain period of time (e.g., at least a week) before the determined advertisement value is deemed accurate enough to offer the advertisement space for sale.

Further, in some embodiments, wearer-view data requirements may require that a certain amount of wearer-view data be generated before an advertisement space can be offered for sale in an ad-marketplace system. For example, an ad-marketplace system may require that a certain number of occurrences of an advertisement space be detected before the determined advertisement value is deemed accurate enough to offer the advertisement space for sale via the marketplace (or in other words, require that the wearer-view data takes into account at least a threshold number of occurrences). Other examples are also possible.

X. Use of Supplemental Gaze Data from Non-Wearable Computing Devices

In some embodiments, an exemplary method may incorporate supplemental gaze data from one or more non-wearable computing devices. In such an embodiment, the supplemental gaze data may include media captured by the non-wearable computing devices. For example, supplemental gaze data may be received from mobile phones, tablet computers, network-enabled video and/or still cameras, and/or other non-wearable computing devices.

Similar to the gaze data from wearable computing devices, the supplemental gaze data is generally indicative of a respective user-view associated with a device that provides supplemental gaze data. Accordingly, an exemplary method may further involve receiving supplemental gaze data from one or more non-wearable computing devices that are registered to a given user-account. A server may then detect additional occurrences of advertisement spaces in the supplemental gaze data, and factor the additional occurrences in when determining the advertisement value for a given advertisement space.

However, because supplemental gaze data is captured at non-wearable devices, supplemental gaze data may less reliably represent what the user actually sees, as compared to gaze data captured by a wearable device that is physically worn on the user's person. Accordingly, in an exemplary method, the server may weight supplemental occurrences that are detected in the supplemental gaze data in order to account for the increased probability that the supplemental gaze data does not represent what the user actually sees. For example, the server may weight a supplemental occurrence by a significance factor corresponding to the likelihood that the corresponding supplemental gaze data is indicative of a respective user-view associated with the non-wearable computing device that provided the supplemental gaze data in which the supplemental occurrence was detected.

In a further aspect, systems may be implemented to actively search supplemental gaze data that is pre-recorded, such as image libraries that are accessible via a network. For example, a server or an associated system may be configured to analyze images from one or more online image albums to determine supplemental user-view data for the advertisement space. In such an embodiment, the supplemental user-view data is based on occurrences of the advertisement space in the plurality of images.

For example, the system may search image albums on a photo-sharing website, social-network website, or another network source, for occurrences of the advertisement space in the images. When an occurrence is found, the system may generate supplemental user-view data for the occurrence. For instance, many such websites require that users open a user-account in order to create photo albums and/or share photos. Accordingly, the system may store data linking the occurrence of the advertisement space to the user-account via which the image was shared.

In a further aspect, one image of an advertisement space may be indicative of a more valuable view of the advertisement space than another image. As such, each image that includes the advertisement space may be evaluated for indications of how significant the occurrence is, so that the occurrence may be weighted accordingly when determining the advertisement value.

For example, an exemplary method may involve analyzing one or more images from one or more image albums to detect any occurrences of the advertisement space in the images. Then, for each image where an advertisement space is detected, the system may determine an ad-value contribution and/or an advertising-value contribution for the given image (note that in some instances, the advertising-value contribution may be used as the ad-value contribution). As a specific example, determining a prominence value corresponding to a prominence of the advertisement space in the given image (e.g., a size and/or location of the advertisement space in the image), and then use the prominence value as a basis for determining an ad-value contribution and/or an advertising-value contribution for the given image. The system may then use any ad-value contributions from these images, such as any prominence values that are determined for any of the images, when determining the advertisement value for a given advertisement space. Similarly, the system may use any advertising-value contributions from these images, such as any prominence values that are determined for any of the images, when determining the advertisement value for the advertisement space.

In a further aspect, data from GPS systems and other sensors, such as magnetometers, accelerometers, and/or gyroscopes may provide supplemental gaze data. In some embodiments, GPS on a wearable computing device or another device (e.g., a mobile phone or tablet) may provide an indication of location, and a magnetometer on the same device may provide an indication of orientation, such that it may be inferred that a user of the device is in a certain location and is facing a certain direction. Further, the location of an advertisement space may also be determined as described herein. Thus, if the user is inferred to be facing a location where and space is located, this may be considered a view of the advertisement space, and thus may be factored into the wearer-view data. Other examples of using GPS and/or sensor data to infer supplemental gaze data are also possible.

XI. Exemplary Wearable Computing Systems

Figure 11A:
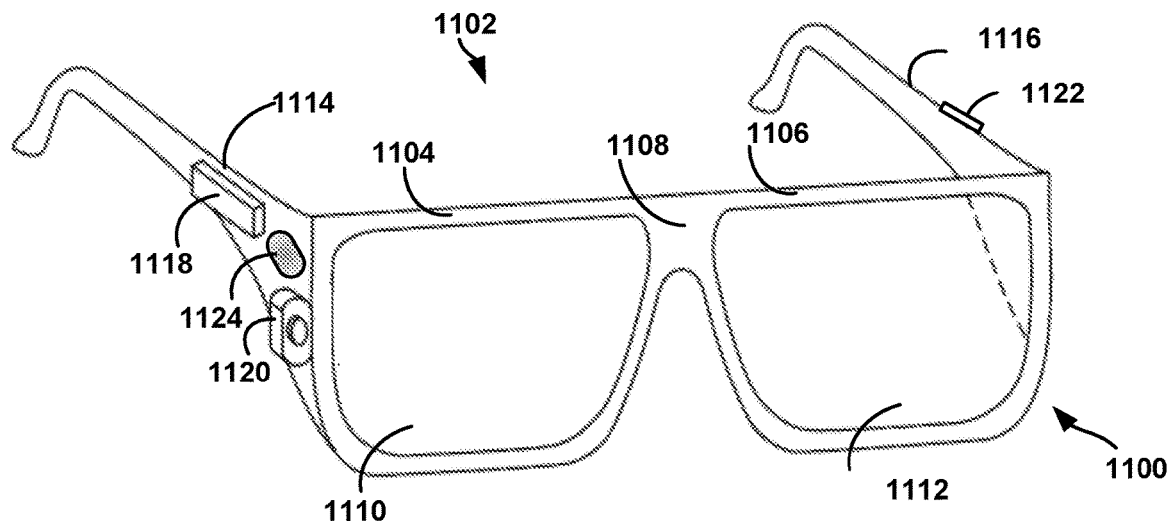
FIG. 11A illustrates a wearable computing system according to an exemplary embodiment.

FIG. 11A illustrates a wearable computing system according to an exemplary embodiment. In FIG. 11A, the wearable computing system takes the form of a head-mounted device (HMD) 1102 (which may also be referred to as a head-mounted display). It should be understood, however, that exemplary systems and devices may take the form of or be implemented within or in association with other types of devices, without departing from the scope of the invention. As illustrated in FIG. 11A, the head-mounted device 1102 comprises frame elements including lens-frames 1104, 1106 and a center frame support 1108, lens elements 1110, 1112, and extending side-arms 1114, 1116. The center frame support 1108 and the extending side-arms 1114, 1116 are configured to secure the head-mounted device 1102 to a user's face via a user's nose and ears, respectively.

Each of the frame elements 1104, 1106, and 1108 and the extending side-arms 1114, 1116 may be formed of a solid structure of plastic and/or metal, or may be formed of a hollow structure of similar material so as to allow wiring and component interconnects to be internally routed through the head-mounted device 1102. Other materials may be possible as well.

One or more of each of the lens elements 1110, 1112 may be formed of any material that can suitably display a projected image or graphic. Each of the lens elements 1110, 1112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 1114, 1116 may each be projections that extend away from the lens-frames 1104, 1106, respectively, and may be positioned behind a user's ears to secure the head-mounted device 1102 to the user. The extending side-arms 1114, 1116 may further secure the head-mounted device 1102 to the user by extending around a rear portion of the user's head. Additionally or alternatively, for example, the HMD 1102 may connect to or be affixed within a head-mounted helmet structure. Other possibilities exist as well.

The HMD 1102 may also include an on-board computing system 1118, a video camera 1120, a sensor 1122, and a finger-operable touch pad 1124. The on-board computing system 1118 is shown to be positioned on the extending side-arm 1114 of the head-mounted device 1102; however, the on-board computing system 1118 may be provided on other parts of the head-mounted device 1102 or may be positioned remote from the head-mounted device 1102 (e.g., the on-board computing system 1118 could be wire- or wirelessly-connected to the head-mounted device 1102). The on-board computing system 1118 may include a processor and memory, for example. The on-board computing system 1118 may be configured to receive and analyze data from the video camera 1120 and the finger-operable touch pad 1124 (and possibly from other sensory devices, user interfaces, or both) and generate images for output by the lens elements 1110 and 1112.

The video camera 1120 is shown positioned on the extending side-arm 1114 of the head-mounted device 1102; however, the video camera 1120 may be provided on other parts of the head-mounted device 1102. The video camera 1120 may be configured to capture images at various resolutions or at different frame rates. Many video cameras with a small form-factor, such as those used in cell phones or webcams, for example, may be incorporated into an example of the HMD 1102.

Further, although FIG. 11A illustrates one video camera 1120, more video cameras may be used, and each may be configured to capture the same view, or to capture different views. For example, the video camera 1120 may be forward- or outward-facing to capture at least a portion of the real-world view perceived by the user. This forward facing image captured by the video camera 1120 may then be used to generate an augmented reality where computer generated images appear to interact with the real-world view perceived by the user.

The sensor 1122 is shown on the extending side-arm 1116 of the head-mounted device 1102; however, the sensor 1122 may be positioned on other parts of the head-mounted device 1102. The sensor 1122 may include one or more of a gyroscope or an accelerometer, for example. Other sensing devices may be included within, or in addition to, the sensor 1122 or other sensing functions may be performed by the sensor 1122.

The finger-operable touch pad 1124 is shown on the extending side-arm 1114 of the head-mounted device 1102. However, the finger-operable touch pad 1124 may be positioned on other parts of the head-mounted device 1102. Also, more than one finger-operable touch pad may be present on the head-mounted device 1102. The finger-operable touch pad 1124 may be used by a user to input commands. The finger-operable touch pad 1124 may sense at least one of a position and a movement of a finger via capacitive sensing, resistance sensing, or a surface acoustic wave process, among other possibilities. The finger-operable touch pad 1124 may be capable of sensing finger movement in a direction parallel or planar to the pad surface, in a direction normal to the pad surface, or both, and may also be capable of sensing a level of pressure applied to the pad surface. The finger-operable touch pad 1124 may be formed of one or more translucent or transparent insulating layers and one or more translucent or transparent conducting layers. Edges of the finger-operable touch pad 1124 may be formed to have a raised, indented, or roughened surface, so as to provide tactile feedback to a user when the user's finger reaches the edge, or other area, of the finger-operable touch pad 1124. If more than one finger-operable touch pad is present, each finger-operable touch pad may be operated independently, and may provide a different function.

Figure 11B:
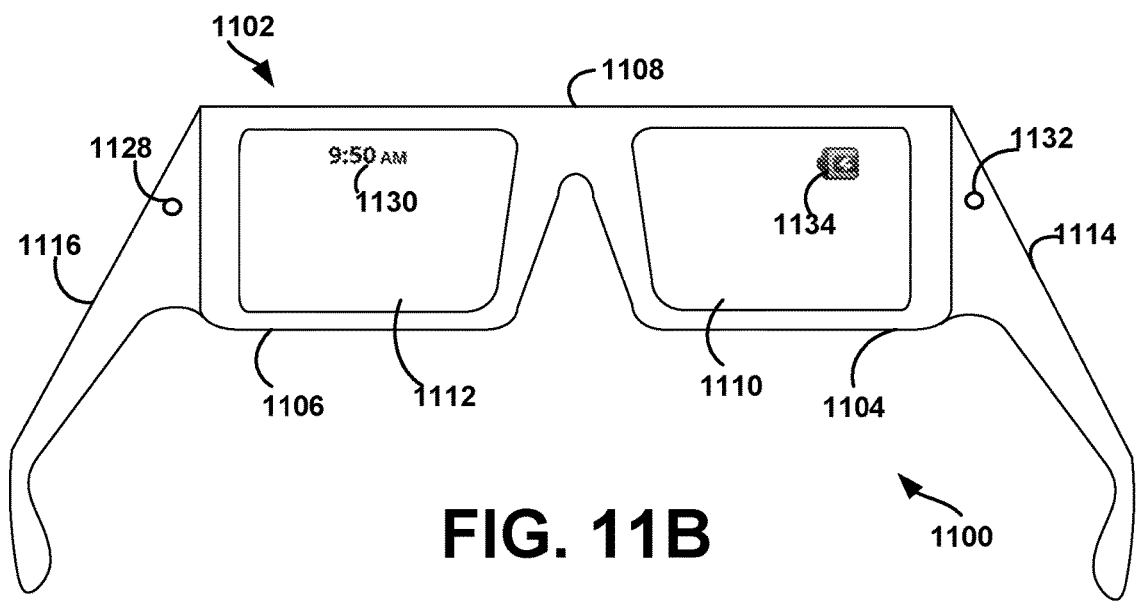
FIG. 11B illustrates an alternate view of the wearable computing device illustrated in FIG. 11A.

FIG. 11B illustrates an alternate view of the wearable computing device illustrated in FIG. 11A. As shown in FIG. 11B, the lens elements 1110, 1112 may act as display elements. The head-mounted device 1102 may include a first projector 1128 coupled to an inside surface of the extending side-arm 1116 and configured to project a display 1130 onto an inside surface of the lens element 1112. Additionally or alternatively, a second projector 1132 may be coupled to an inside surface of the extending side-arm 1114 and configured to project a display 1134 onto an inside surface of the lens element 1110.

The lens elements 1110, 1112 may act as a combiner in a light projection system and may include a coating that reflects the light projected onto them from the projectors 1128, 1132. In some embodiments, a reflective coating may not be used (e.g., when the projectors 1128, 1132 are scanning laser devices).

In alternative embodiments, other types of display elements may also be used. For example, the lens elements 1110, 1112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 1104, 1106 for driving such a matrix display. Alternatively or additionally, a laser or LED source and scanning system could be used to draw a raster display directly onto the retina of one or more of the user's eyes. Other possibilities exist as well.

Figure 12A:
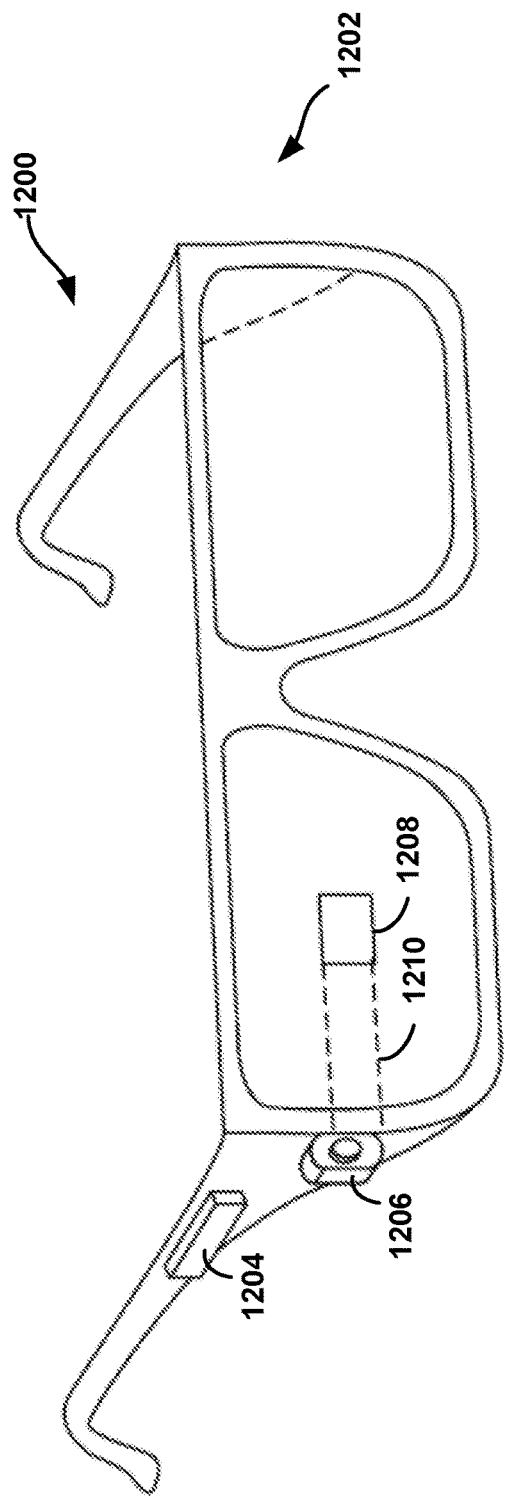
FIG. 12A illustrates another wearable computing system according to an exemplary embodiment.

FIG. 12A illustrates another wearable computing system according to an exemplary embodiment, which takes the form of an HMD 1202. The HMD 1202 may include frame elements and side-arms such as those described with respect to FIGS. 11A and 11B. The HMD 1202 may additionally include an on-board computing system 1204 and a video camera 1206, such as those described with respect to FIGS. 11A and 11B. The video camera 1206 is shown mounted on a frame of the HMD 1202. However, the video camera 1206 may be mounted at other positions as well.

As shown in FIG. 12A, the HMD 1202 may include a single display 1208 which may be coupled to the device. The display 1208 may be formed on one of the lens elements of the HMD 1202, such as a lens element described with respect to FIGS. 11A and 11B, and may be configured to overlay computer-generated graphics in the user's view of the physical world. The display 1208 is shown to be provided in a center of a lens of the HMD 1202, however, the display 1208 may be provided in other positions. The display 1208 is controllable via the computing system 1204 that is coupled to the display 1208 via an optical waveguide 1210.

Figure 12B:
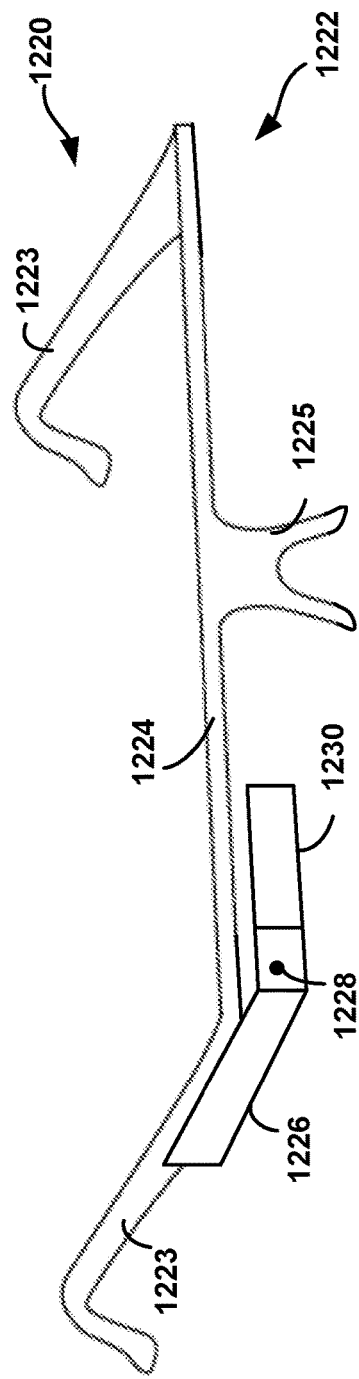
FIG. 12B illustrates another wearable computing system according to an exemplary embodiment.

FIG. 12B illustrates another wearable computing system according to an exemplary embodiment, which takes the form of an HMD 1222. The HMD 1222 may include side-arms 1223, a center frame support 1224, and a bridge portion with nosepiece 1225. In the example shown in FIG. 12B, the center frame support 1224 connects the side-arms 1223. The HMD 1222 does not include lens-frames containing lens elements. The HMD 1222 may additionally include an on-board computing system 1226 and a video camera 1228, such as those described with respect to FIGS. 11A and 11B.

The HMD 1222 may include a single lens element 1230 that may be coupled to one of the side-arms 1223 or the center frame support 1224. The lens element 1230 may include a display such as the display described with reference to FIGS. 11A and 11B, and may be configured to overlay computer-generated graphics upon the user's view of the physical world. In one example, the single lens element 1230 may be coupled to the inner side (i.e., the side exposed to a portion of a user's head when worn by the user) of the extending side-arm 1223. The single lens element 1230 may be positioned in front of or proximate to a user's eye when the HMD 1222 is worn by a user. For example, the single lens element 1230 may be positioned below the center frame support 1224, as shown in FIG. 12B.

Figure 13:
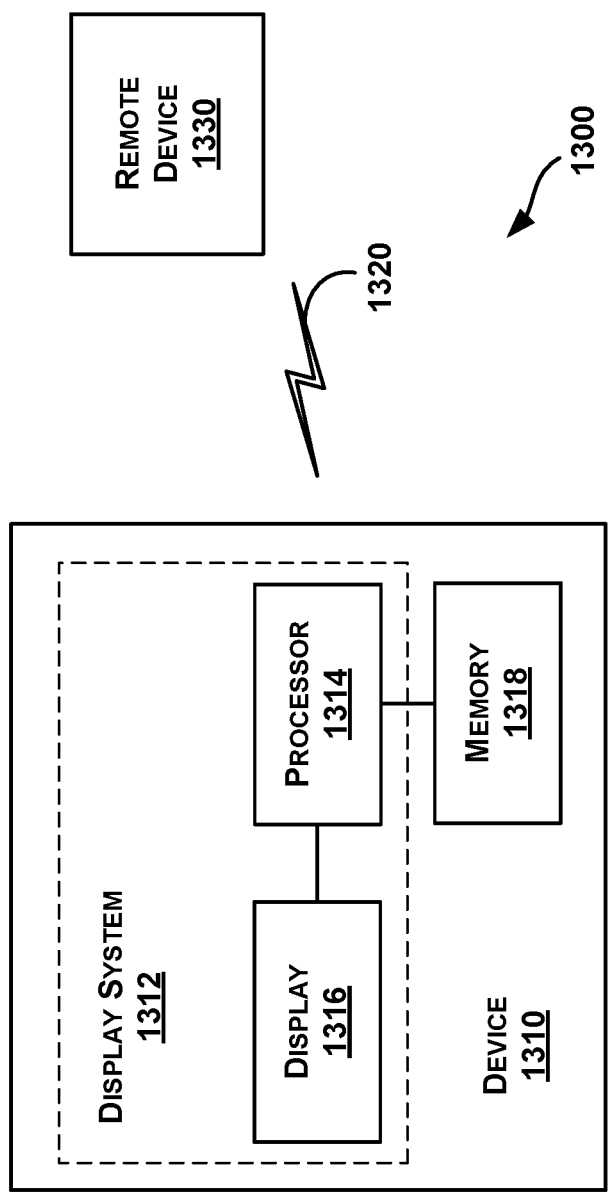
FIG. 13 illustrates a schematic drawing of a wearable computing device according to an exemplary embodiment.

FIG. 13 illustrates a schematic drawing of a wearable computing device according to an exemplary embodiment. In system 1300, a device 1310 communicates using a communication link 1320 (e.g., a wired or wireless connection) to a remote device 1330. The device 1310 may be any type of device that can receive data and display information corresponding to or associated with the data. For example, the device 1310 may be a heads-up display system, such as the head-mounted devices 1102, 1202, or 1222 described with reference to FIGS. 11A, 11B, 12A, 12B, and 13.

Thus, the device 1310 may include a display system 1312 comprising a processor 1314 and a display 1316. The display 1310 may be, for example, an optical see-through display, an optical see-around display, or a video see-through display. The processor 1314 may receive data from the remote device 1330, and configure the data for display on the display 1316. The processor 1314 may be any type of processor, such as a micro-processor or a digital signal processor, for example.

The device 1310 may further include on-board data storage, such as memory 1318 coupled to the processor 1314. The memory 1318 may store software that can be accessed and executed by the processor 1314, for example.

The remote device 1330 may be any type of computing device or transmitter including a laptop computer, a mobile telephone, or tablet computing device, etc., that is configured to transmit data to the device 1310. The remote device 1330 and the device 1310 may contain hardware to enable the communication link 1320, such as processors, transmitters, receivers, antennas, etc.

In FIG. 13, the communication link 1320 is illustrated as a wireless connection; however, wired connections may also be used. For example, the communication link 1320 may be a wired serial bus such as a universal serial bus or a parallel bus. A wired connection may be a proprietary connection as well. The communication link 1320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 1330 may be accessible via the Internet and may include a computing cluster associated with a particular web service (e.g., social-networking, photo sharing, address book, etc.).

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A computer-implemented method comprising:
  receiving, by a computing system, a listing-suggestion request associated with a first account, wherein the listing-suggestion request indicates an instruction to opt in to a service that provides suggestions of real-world surfaces usable for overlay of augmented-reality content; and
  responsive to the listing-suggestion request, the computing system:
    (a) detecting, by one or more processors, in image data received from one or computing devices, one or more occurrences of a real-world object;
    (b) determining, by one or more processors, that the first surface of real-world object is associated with the first account; and
    (c) determining, by one or more processors, that the first account is not associated with rights to overlay augmented-reality content to the first surface; and
    (d) responsive to determining that the first account is not associated with rights to overlay augmented-reality content to the first surface:
      (i) using, by one or more processors, the image data as a basis for determining a value corresponding to overlay of augmented-reality content on the first surface of the real-world object; and
      (ii) sending, by one or more processors, a listing-suggestion message to a computing device corresponding to the first account, wherein the listing-suggestion message indicates the determined value.

2. The method of claim 1, wherein using the image data to determine the value corresponding to overlay of augmented-reality content on the first surface of the real-world object comprises:
  using the image data to generate wearer-view data for the real-world object;
  using the wearer-view data for the real-world object as a basis for determining a value corresponding to overlay of augmented-reality content on the first surface of the real-world object; and
  causing the computing device to send a listing-suggestion message to a computing device corresponding to the first account, wherein the listing-suggestion message indicates the value corresponding to overlay of augmented-reality content on the first surface.

3. The method of claim 1, wherein the first surface is a non-display surface of a laptop computer.

4. The method of claim 1, wherein the value comprises a value corresponding to overlay of augmented-reality content on the first surface of the real-world object.

5. The method of claim 1, wherein the first surface is located on an article of clothing.

6. The method of claim 1, wherein the first surface is located on an automobile.

7. The method of claim 1, further comprising:
  after the initial time of the listing, receiving subsequent image data from a plurality of wearable computing devices, wherein the subsequent image data is indicative of a respective wearer-view associated with each of the wearable computing devices; and
  analyzing the subsequent image data to detect occurrences of the first surface in the subsequent image data;
  updating the value based at least in part on occurrences of the first surface in the subsequent image data; and
  sending an updated listing-suggestion message to the computing device corresponding to the first account, wherein the updated listing-suggestion message indicates the updated value.

8. A system for identifying real-world surfaces for overlay of augmented-reality content, the system comprising:
  at least one communication interface operable to communicate with one or more client devices;
  a non-transitory computer-readable medium; and
  program instructions stored on the non-transitory computer-readable medium and executable by at least one processor to:
    (i) receive a listing-suggestion request associated with a first account, wherein the listing-suggestion request indicates an instruction to opt in to a service that provides suggestions of real-world surfaces usable for overlay of augmented-reality content, and
    (ii) subsequent to receipt of the listing-suggestion request:
      (a) detect, with the at least one processor, in image data received from one or wearable devices, one or more occurrences of a first surface of a real-world object in the gaze data;
      (b) determine, with the at least one processor, that the first surface of real-world object is associated with the first account; and
      (c) determine, with the at least one processor, that the first account is not associated with rights to overlay augmented-reality content to the first surface; and
      (d) responsive to determining that the first account is not associated with rights to overlay augmented-reality content to the first surface, use, with the at least one processor, the image data to generate wearer-view data as a basis for determining a value corresponding to overlay of augmented-reality content on the first surface of the real-world object, and send, with the at least one processor, a listing-suggestion message to a computing device corresponding to the first account, wherein the listing-suggestion message indicates the determined value.

9. A computer-implemented method comprising:

receiving image data from a plurality of wearable computing devices;

receiving an indication of interest that identifies a real-world object, wherein the real-world object is associated with a first account and the indication of interest is associated with a second account;

determining, by one or more processors, whether the first account is associated with an optional function that identifies real-world surfaces usable for overlay of augmented-reality content;

when the first account is determined to be associated with an optional service:
 (a) analyzing, by one or more processors, the image data from the plurality of wearable computing devices to detect one or more occurrences the real-world object in the image data;
 (b) determining, by one or more processors, a value corresponding to overlay of augmented-reality content on the real-world object;
 (c) using, by one or more processors, the image data as a basis for determining a value corresponding to overlay of augmented-reality content on the real-world object, and
 (d) sending, by one or more processors, a listing-suggestion message to a computing device corresponding to the first account, wherein the listing-suggestion message indicates the determined value; and when the first account is not associated with an optional service, refraining from analyzing the image data for occurrences of the first surface.

10. The method of claim 9, wherein using the image data to determine the value corresponding to overlay of augmented-reality content on the real-world object comprises:

using the image data to generate wearer-view data for the real-world object;

using the wearer-view data for the real-world object as a basis for determining a value corresponding to overlay of augmented-reality content on the real-world object; and causing the computing device to send a listing-suggestion message to a computing device corresponding to the first account, wherein the listing-suggestion message indicates the value corresponding to overlay of augmented-reality content on the first surface.

11. The method of claim 9, wherein the real-world object comprises a laptop computer.

12. The method of claim 9, wherein the value comprises a value corresponding to overlay of augmented-reality content on at least one surface of the real-world object.

13. The method of claim 9, wherein the real-world object is an article of clothing.

14. The method of claim 9, wherein the real-world object takes the form of or is part of an automobile.

15. The method of claim 14, further comprising:

after the initial time of the listing, receiving subsequent image data from a plurality of wearable computing devices;

analyzing the subsequent image data to detect occurrences of the real-world object in the subsequent image data;

updating the value based at least in part on occurrences of the real-world object in the subsequent image data; and sending an updated listing-suggestion message to the computing device corresponding to the first account, wherein the updated listing-suggestion message indicates the updated value.

* * * * *